United States Patent
Rune

(10) Patent No.: US 9,398,472 B2
(45) Date of Patent: Jul. 19, 2016

(54) METHODS AND ARRANGEMENTS FOR REPLACING AN AREA IDENTIFIER IN A WIRELESS COMMUNICATION NETWORK

(75) Inventor: Johan Rune, Lidingo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 116 days.

(21) Appl. No.: 13/119,865

(22) PCT Filed: Oct. 2, 2008

(86) PCT No.: PCT/SE2008/051112
§ 371 (c)(1),
(2), (4) Date: Mar. 18, 2011

(87) PCT Pub. No.: WO2010/039071
PCT Pub. Date: Apr. 8, 2010

(65) Prior Publication Data
US 2011/0171979 A1    Jul. 14, 2011

(51) Int. Cl.
*H04M 1/00* (2006.01)
*H04W 24/02* (2009.01)

(52) U.S. Cl.
CPC ................... *H04W 24/02* (2013.01)

(58) Field of Classification Search
CPC . H04W 16/00; H04W 24/02; H04W 28/0284; H04W 28/0289; H04W 88/08; H04W 88/12; H04L 47/70
USPC ............... 455/433–435.3, 560, 561
See application file for complete search history.

(56) References Cited

U.S. PATENT DOCUMENTS

| | | | |
|---|---|---|---|
| 6,088,587 A * | 7/2000 | Abbadessa | 455/424 |
| 6,628,946 B1 * | 9/2003 | Wiberg et al. | 455/434 |
| 6,968,196 B1 | 11/2005 | Bäck et al. | |
| 7,113,784 B2 | 9/2006 | Fujiwara et al. | |
| 2002/0151307 A1 * | 10/2002 | Demarez et al. | 455/445 |
| 2006/0014541 A1 * | 1/2006 | Kato | 455/446 |
| 2008/0144550 A1 | 6/2008 | Makhlouf et al. | |
| 2008/0198763 A1 * | 8/2008 | Fischer et al. | 370/254 |
| 2008/0304439 A1 * | 12/2008 | Keevill et al. | 370/328 |

(Continued)

FOREIGN PATENT DOCUMENTS

| | | |
|---|---|---|
| EP | 1 519 613 A2 | 3/2005 |
| JP | 2003-158762 A | 5/2003 |
| JP | 2008-193365 A | 8/2008 |

(Continued)

OTHER PUBLICATIONS

International Search Report, PCT Application No. PCT/SE2008/051112, Jan. 20, 2010.

(Continued)

*Primary Examiner* — Thai Vu
(74) *Attorney, Agent, or Firm* — Patent Porfolio Builders, PLLC

(57) ABSTRACT

Method and arrangements in a first network node (101) and a user equipment (102) for handling replacement of a first area identifier (A1) of a cell (110) served by the first network node (101) with a second area identifier (A2) is provided. An area identifier replacement period has been introduced in order to allow the first and second area identifiers to be operated simultaneously in a cell that is being updated. Furthermore, a method and arrangement in a second network node for handling paging of user equipments during the area identifier replacement period is provided.

17 Claims, 11 Drawing Sheets

(56) References Cited

U.S. PATENT DOCUMENTS

2010/0075658 A1* 3/2010 Hou et al. .................. 455/422.1
2010/0120448 A1 5/2010 Iwamura et al.

FOREIGN PATENT DOCUMENTS

| WO | WO 02/41659 A1 | 5/2002 |
| WO | WO 2007/053103 A2 | 5/2007 |
| WO | WO 2008/054668 A2 | 5/2008 |
| WO | WO 2008/093750 A1 | 8/2008 |

OTHER PUBLICATIONS

Written Opinion of the International Searching Authority, PCT Application No. PCT/SE2008/051112, Jan. 20, 2010.
International Preliminary Report on Patentability, PCT Application No. PCT/SE2008/051112, Feb. 17, 2011.
Japanese Office Action with English language Summary of the Office Action, Application No. 2011-530019, Jan. 28, 2013.
3GPP TS 36.331 v8.0.0, "3rd Generation Partnership Project; Technical Specification Group Radio Access Network; Evolved Universal Terrestrial Radio Access (E-UTRA) Radio Resource Control (RRC); Protocol specification (Release 8)", Dec. 2007.
3GPP TS 36.300 v8.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Dec. 2007.

* cited by examiner

METHODS AND ARRANGEMENTS FOR REPLACING AN AREA IDENTIFIER IN A WIRELESS COMMUNICATION NETWORK

CROSS REFERENCE TO RELATED APPLICATION

This application is a 35 U.S.C. §371 national stage application of PCT International Application No. PCT/SE2008/051112, filed on 2 Oct. 2008, the disclosure and content of which is incorporated by reference herein in its entirety. The above-referenced PCT International Application was published in the English language as International Publication No. WO 2010/039071 A1 on 8 Apr. 2010.

TECHNICAL FIELD

The present invention relates to methods and arrangements in a wireless communication network, more particularly to a method and arrangement in a first network node for replacing a first area identifier of a cell served by the first network node with a second area identifier for the cell, and to a method and arrangement in a user equipment for, during an area identifier replacement period, responding to a replacement of a first area identifier of a cell served by a first network node with a second area identifier for the cell. Furthermore, the present invention relates to a method and arrangement in a second network node for paging a user equipment during an area identifier replacement period.

BACKGROUND

A cellular network, for example a wireless communication network, usually has capability to keep track of mobile terminals, which are located in or moving within the cellular network and are not actively communicating with the network. The tracking of the mobile terminals is achieved by means of arranging cells of the cellular network into special areas, generally denoted registration areas, and then the mobile terminal is assigned such a registration area. A registration area comprises a number of cells. A cell of the cellular network is a certain area, which is served by a transceiver unit for transmitting and receiving signals to and from that area. The mobile terminal may then move around within the registration area (i.e. within an area served by a number of cells) without reporting its more precise location (i.e. within which cell among the cells of the registration area the mobile terminal is located) to the network. When the mobile terminal leaves the assigned registration area, it reports its new location to the network and is assigned a new registration area within which it may move around without reporting to the network. The mobile terminal is also requested to periodically report its location to the network, even if it has not left its assigned registration area. This is sometimes referred to as periodic registration. In this manner, the mobile terminal informs the network about the fact that the mobile terminal is still reachable and has not lost contact with the network. As a result, when paging the mobile terminal, the cellular network only needs to page the mobile terminal in its assigned registration area.

When designing or configuring the registration areas, the size of the registration areas, i.e. how many cells shall be part of one registration area, and the location of the registration areas, i.e. which cells shall be part of one registration area, must be considered. In other words, a registration area configuration of the network establishes which cells of the network belong to which registration area. Large registration areas result in few reports from a mobile terminal to the network, but many cells need to be paged when the network contacts the mobile terminal. Similarly, small registration areas result in effective paging (few cells need to be paged in), but frequent reports from the mobile terminal when entering a registration area that is not assigned to the mobile terminal. The consideration of which cells to include is determined by mobility patterns of the mobile terminals due to, for example, highways or shopping centers. Consequently, there is a trade off between optimization for a minimal number of cells when paging or for minimal load on the network due to location reporting.

Algorithms can be designed to optimize (or nearly optimize) the registration area configuration in a network. These algorithms are normally based on estimations or measurements of mobility patterns and mobile terminating traffic.

Furthermore, since radio networks are by nature dynamic and evolving the registration area configuration for a cellular network cannot be determined once and for all. On the contrary, as the network expands and as traffic and mobility behaviors of the users/mobile terminals change, the registration area configuration has to be re-planned and updated to provide a good (or close to optimal) trade-off between optimization for paging or location reporting. Such an update or re-planning of the registration area configuration is referred to as a registration area reconfiguration (or reconfiguration of registration areas).

When changing the registration area that a cell belongs to, system information, being broadcast in the cell, need to be updated. The system information comprises information about registration areas.

As a first alternative, the cell is taken out of service during the update of the system information. Disadvantageously, this causes service interruptions in a cell that is updated, i.e. a cell which is assigned to a registration area, being different from the registration area the cell presently is associated with. Consequently, frequent updates are not desired. Moreover, an update of the entire network would similarly require service interruption of the entire network. Such a procedure would be unacceptable. Instead, any registration area reconfigurations would need to be performed in a stepwise manner in order to avoid complete service interruption of the network.

As a second alternative, system information is updated without taking the cell of out service. A disadvantage with this approach is that the mobile terminals within the cell being updated will cause a massive peak of reports to the network. If many cells are updated simultaneously, the network may be overloaded and, in practice, cause service interruption.

In 3$^{rd}$ Generation Partnership Project (3GPP) EPS (Evolved Packet System, also known as SAE/LTE, System Architecture Evolution/Long Term Evolution), an effective registration area consists of a list of so-called tracking areas (TAs). The tracking areas are a (semi-fixed) configured property of the network. The list of tracking areas can be individually composed and assigned to each mobile terminal in order to somewhat even out the load due to location reporting in the network. Potentially, the lists of tracking areas for each mobile terminal in the network may be individually adapted to the mobile terminal or its user such as to fit with the mobility pattern and traffic behavior of each particular user or mobile terminal. The network, represented by a mobility management entity (or an MME), may assign a new tracking area list to any mobile terminal at any time when the mobile terminal is connected to the network (more particularly in RRC_CONNECTED mode, according to 3GPP LTE terminology), but typically assignment of lists of tracking areas is done during the tracking area update procedure. Another procedure when a list of tracking areas is typically assigned to a mobile terminal is when the mobile terminal initially registers with the network (e.g. when the mobile terminal is powered on), i.e. during an attach procedure.

Moreover, each LTE cell belongs to a single tracking area (TA), being associated with a tracking area identity (TAI). The tracking area identity comprises a Public Land Mobile Network identity (e.g. Mobile Country Code+Mobile Network Code) and a tracking area code (TAC). Further, the tracking area identity is included in the system information that is broadcast in the cell. An LTE Evolved Universal Terrestrial Radio Access Network Node B (or an E-UTRAN Node B or eNode B or eNB) belongs to one or more MME pools, where each MME pool comprises at least one MME. A restriction on how tracking areas may be planned in the network is that a tracking area is not allowed to comprise cells that belong to different MME pools, i.e. all the cells of a tracking area must belong to eNBs which are connected to the same MME pool.

SUMMARY

An object of the present invention is to provide improved methods and arrangements for handling updates of area information, such as identifiers for tracking areas and registration areas, in a wireless communication network, thereby eliminating or reducing service interruptions and load on the network during such replacements or updates.

This object and other objects are met by the methods and arrangements as set forth in the appended independent claims. Specific embodiments are defined in the dependent claims.

According to an aspect of the invention, there is provided a method in a first network node for replacing a first area identifier of a cell served by the first network node with a second area identifier for the cell, the first network node being comprised in a wireless communication network. The first network node sends the first area identifier to a user equipment in the cell. Furthermore, the first network node receives the second area identifier from a second network node, comprised in the wireless communication network. In a further step, the first network node sends the first and second area identifiers to the user equipment repeatedly during an area identifier replacement period. Then, when the area identifier replacement period has elapsed, the first network node sends the second area identifier to the user equipment and cancels sending of the first area identifier. In this manner, the first area identifier is replaced by the second area identifier.

The first network node may be a radio base station or an eNode B and the second network node may be an OSS (Operation Support System) or an MME, using 3GPP LTE terminology.

It shall be noted that the term "user equipment", or abbreviated UE, includes but is not limited to a wireless transmit/receive unit, a mobile station, a fixed or mobile subscriber unit, a mobile terminal, a pager, a cellular telephone, a personal digital assistant (PDA), a computer, or any other type of user device capable of operating in a wireless, cellular communication network.

Moreover, it may be noted that the expression "area identifier(s)" includes, but is not limited to, tracking area identifier(s) and registration area identifier(s). In addition, the expression "area information" has been used to denote area identifiers, tracking areas and registration areas or similar items.

According to another aspect of the invention, there is provided an arrangement in a first network node for replacing a first area identifier of a cell served by the first network node with a second area identifier for the cell, the first network node being comprised in a wireless communication network. Furthermore, the arrangement comprises a sending unit configured to send the first area identifier to a user equipment in the cell, a receiving unit configured to receive the second area identifier from a second network node, comprised in the wireless communication network. The sending unit is further configured to repeatedly send the first and second area identifiers to the user equipment during an area identifier replacement period, and when the area identifier replacement period has elapsed, configured to send the second area identifier to the user equipment and configured to cancel sending of the first area identifier. Thereby, the first area identifier is replaced by the second area identifier.

The area identifier replacement period has been introduced in order to allow two different area identifiers, the area identifier changing from and the area identifier changing to, to be operated simultaneously in a cell, being updated. As a result, the sending of location reports from user equipments in the affected cell may be spread out in time. It is sufficient that the area identifiers are active (or operated) simultaneously. As will be evident from the description below, the area identifiers need not necessarily be sent or broadcast in the cell simultaneously.

Advantageously, the method and arrangement in the first network node for replacing area identifiers (or configuring area information) are provided in order to allow such replacement without requiring service interruptions or causing large report loads on the network. The network may be represented by the second network node.

According to yet another aspect of the invention, there is provided a method in a user equipment for, during an area identifier replacement period, responding to a replacement of a first area identifier of a cell served by a first network node with a second area identifier for the cell, the replacement being completed when the area identifier replacement period has elapsed. The user equipment is configured to store area identifiers. The first network node and the user equipment are comprised in a wireless communication network. Moreover, the user equipment is located in the cell. The user equipment receives the second area identifier from the first network node. In another step, the user equipment sends a location report to a second network node at a point in time within the area identifier replacement period, wherein the first network node is served by the second network node. The second area identifier is sent to the second network node in conjunction with the location report. In a still further step, the user equipment receives a list of area identifiers, based on the location report and the second area identifier, to be stored in the user equipment from the second network node.

Generally, it may be noted that sending of information, such as the location report, to the second network node from the user equipment is performed by sending the information via the first network node.

According to still another aspect of the invention, there is provided an arrangement in a user equipment for responding to a replacement of a first area identifier of a cell served by a first network node with a second area identifier, the replacement being completed when an area identifier replacement period has elapsed, the user equipment being configured to store area identifiers, the first network node and the user equipment being comprised in a wireless communication network, the user equipment being located in the cell. Furthermore, the arrangement comprises a receiving unit configured to receive the second area identifier from the first network node, a sending unit configured to send a location report to a second network node at a point in time within the area identifier replacement period, wherein the first network node is served by the second network node and the second area identifier is sent to the second network node in conjunction with the location report, wherein the receiving unit further is configured to receive a list of area identifiers to be stored in the user equipment from the second network node. In this manner, the user equipment is adapted to handle simultaneous operation of area identifiers.

As a consequence of the area identifier replacement period, during which period two area identifiers are operated simultaneously, it is no longer evident in which cell or cells the user equipment shall be paged. Therefore, a strategy for paging of user equipment in a cell, being updated, is needed.

Hence, according to a further aspect of the invention, there is provided a method in a second network node for paging a user equipment during an area identifier replacement period, a replacement of a first area identifier with a second area identifier being completed within the area identifier replacement period, wherein the first and second area identifiers are associated with a cell of a first network node during the area identifier replacement period, and the first network node is served by the second network node, the first and second network nodes being comprised in a wireless communication network. The second network node receives a location report from the user equipment, wherein the second area identifier is received in conjunction with the location report. In a further step, the second network node stores area identifiers, including the second area identifier, wherein the area identifiers are associated with the user equipment in the second network node. Moreover, the second network node pages the user equipment in the cell during the area identifier replacement period, if the step of receiving occurred before the beginning of the area identifier replacement period, and if any one of the first and second area identifiers is stored in the list of area identifiers.

According to a still further aspect of the invention, there is provided arrangement in a second network node for paging a user equipment during an area identifier replacement period, a replacement of a first area identifier with a second area identifier being completable when the area identifier replacement period has elapsed, wherein the first and second area identifiers are associatable with a cell of a first network node during the area identifier replacement period, and the first network node is servable by the second network node, the first and second network nodes being comprised in a wireless communication network. Furthermore, the arrangement comprises a receiving unit configured to receive a location report from the user equipment, wherein the second area identifier is receivable in conjunction with the location report, a storing unit configured to store area identifiers, including the second area identifier, wherein the area identifiers are associated with the user equipment in the second network node, and a paging unit configured to page the user equipment in the cell during the area identifier replacement period, if the location report was received before the beginning of the area identifier replacement period, and if any one of the first and second area identifiers is stored in the list of area identifiers. Advantageously, the method and arrangement in the second network node provide an efficient paging strategy during an area identifier replacement period.

A further advantage with the proposed methods and arrangements are that more frequent replacements (or updates) of the area identifiers (or area information) are allowed, since service interruptions and report overloads are avoided. In addition, less effective paging is avoided thanks to the method and arrangement in a second network node. Using different wording, the threshold for when a configuration update may be considered to be motivated is lowered. As a result, an automated area information planning and optimization scheme may be applied to the wireless communication network without causing the above mentioned disadvantages. A benefit with the automated area information planning and optimization scheme is that the area information configuration may be adapted to changing conditions of the network and, consequently, more closely track an optimal area configuration for the evolving wireless communication network. For example, optimal configurations may vary with time as a consequence of network expansions (e.g. more densely deployed radio base stations), increasing number of subscribers in the network, or changing behavior of user equipments in the wireless communication system.

Moreover, another advantage is that complete updates of the entire network would be possible, i.e. the update is allowed to affect any cells that need to be reconfigured. In this manner, an optimized area information configuration is momentarily achieved or the area information configuration is momentarily as optimal as practically possible. Also, when a TA configuration algorithm calculates an optimal TA configuration for the entire network, the new TA configuration may be implemented simultaneously in the entire network (using synchronized TA configuration update, see below).

Further features of, and advantages with, the present invention will become apparent when studying the appended claims and the following description. Those skilled in the art realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
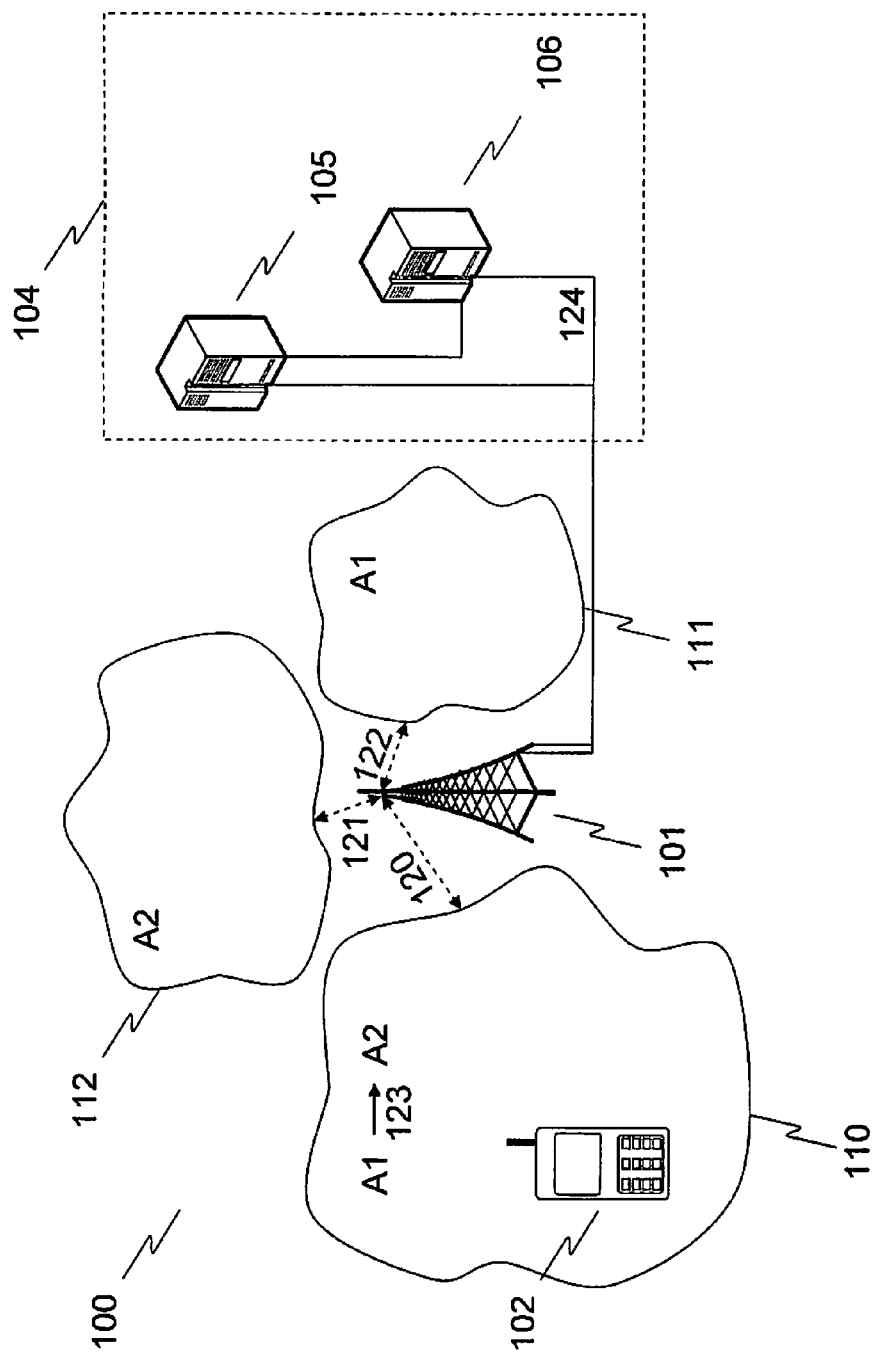
FIG. 1 shows an overview of a wireless communication network.

It shall be noted that the terms "area identifier update", "area identifier replacement", "area configuration procedure", "area configuration update", "area information update", "TAC update", etc have been used interchangeably and shall be taken to describe the same procedure, method or mechanism. It shall also be noted that the terms "tracking area identifier", "registration area", "area information" and "area identifier" have been used to denote the same item. Moreover, the expression "old tracking area identifier" refers to the "first area identifier" and, likewise, the expression "new tracking area identifier" refers to "the second area identifier".

When referred to hereinafter, the term "network node" includes but is not limited to a base station, an E-UTRAN Node-B (eNode B), a site controller, an access point (AP), a mobility management entity (MME) or an operations and support system (OSS) or any other type of interfacing device capable of operating in a wireless communication network.

Throughout the following description similar reference numerals have been used to denote similar steps, elements, parts, items or features, when applicable.

In FIG. 1, there is shown a wireless, cellular communication network 100, comprising an operation and support system (OSS) 105, a mobility management entity (MME) 106, a base station 101 and a mobile terminal 102. The interface between the base station 101 and the MME 106 is an S1 interface 124. The base station or eNB 101 serves three cells 110, 111, 112 as indicated by the dashed arrows 120, 121, 122. Cell 111 and cell 112 are associated with tracking areas, A1 and A2, respectively. The base station updates, as indicated by arrow 123, the system information broadcast in the third cell 110 such that an old tracking area A1 is replaced by a new tracking area A2.

Figure 2:
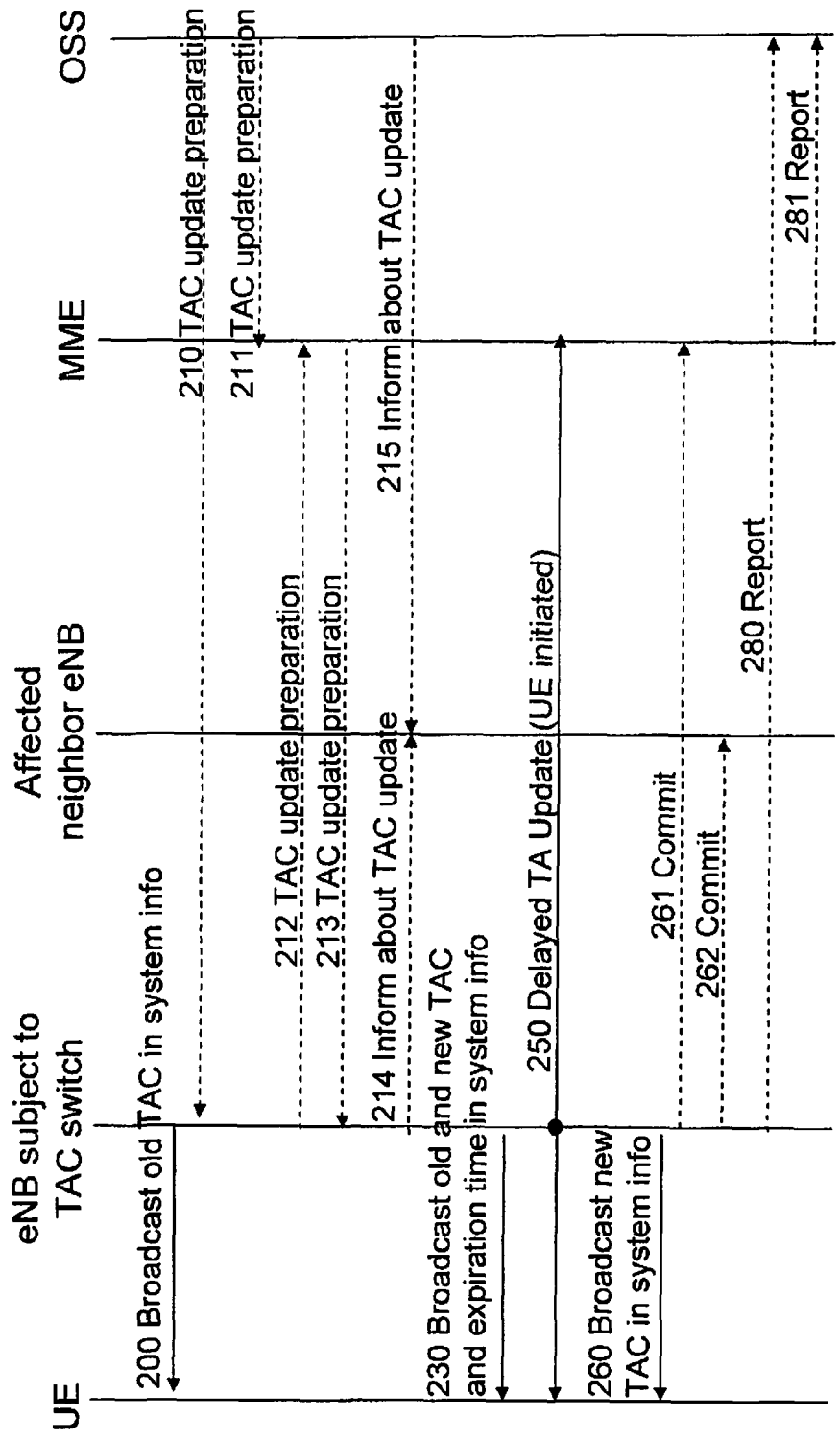
FIG. 2 shows a signaling chart according to embodiments of a method in the wireless communication network of FIG. 1.
Figure 9:
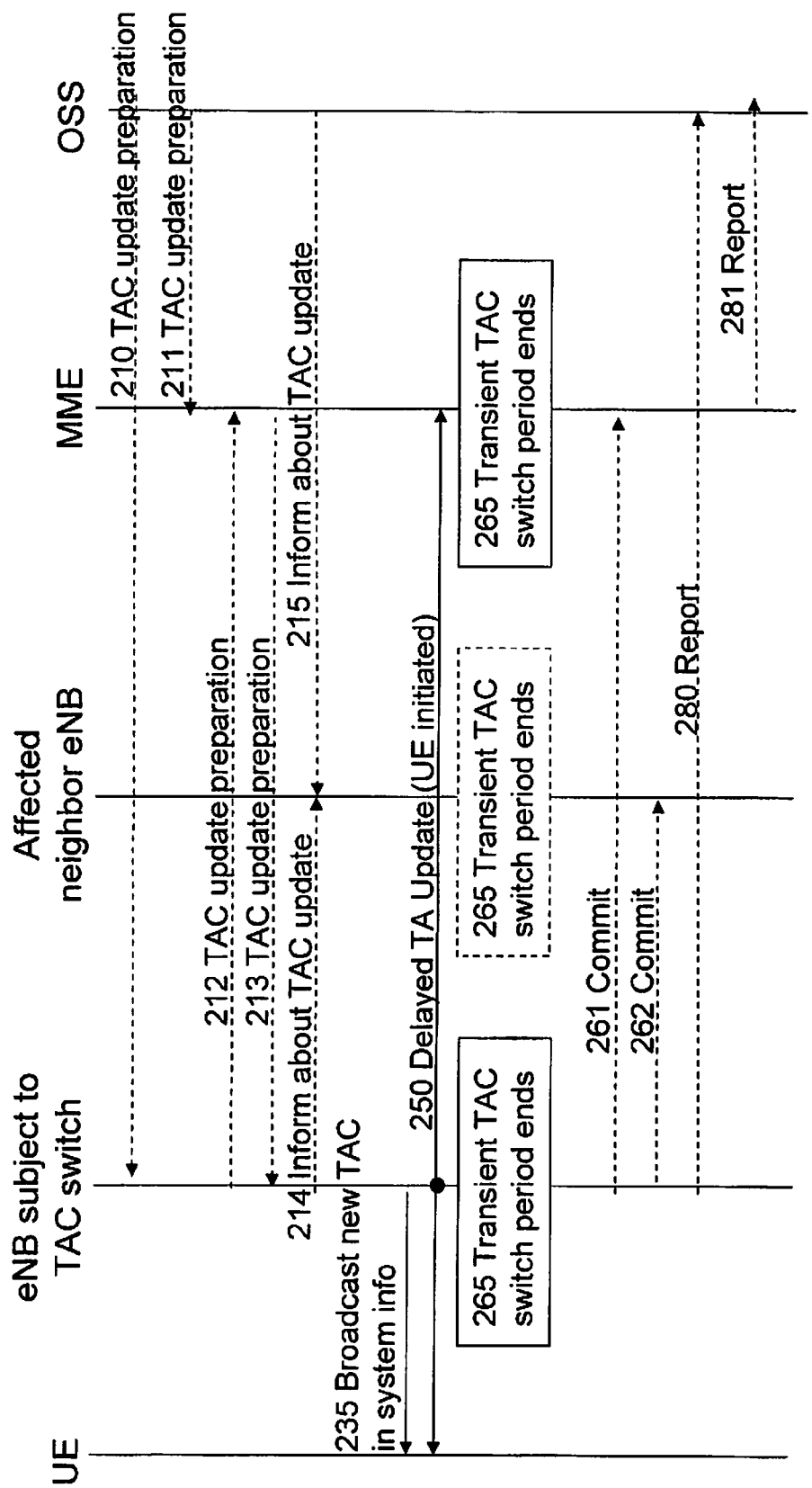
FIG. 9 shows a combined signaling and flow chart according to some embodiments of the method in the wireless communication network for updating of area information in the wireless communication network of FIG. 1.

The base station (also referred to as a first network node) may respond to the update request in different manners. With reference to FIG. 2 and FIG. 9, respectively, two examples, referred to as base station behavior variant 1 and base station behavior variant 2 (or solution variant 1 and solution variant 2), are described.

The OSS 105 may initiate the TA configuration change after determining that it is beneficial to change to a new TA configuration. The OSS 105 may prepare each affected eNB 101 with a new TAC, an expiry time for the old TAC and possibly a start time for the TAC update procedure and prepare each affected MME 106 with basically the same information as the eNB 101. Alternatively or additionally, the OSS 105 may prepare only each affected MME 106, which in turn prepares each affected eNB 101 over the S1 interface, or vice versa, i.e. the OSS 105 prepares each affected eNB 101, which in turn informs each affected MME 106 over the S1 interface. The S1 interface is an interface between the eNB 101 and the MME 106.

The OSS 105 may also inform an affected eNB's 101 neighbor eNBs (not shown in FIG. 1), such that they avoid handing over a UE 102 to a cell 110, 111, 112 in which the new TAC is included in a list of forbidden TAs of the UE. A neighbor eNode B has at least one cell which is a neighbor to at least one cell belonging to the affected eNB. The list of forbidden TAs, if present, identifies one or more TAs that the UE 102 is not allowed to register in (i.e. the network will not serve the UE in such TAs). Sending of information concerning an affected eNB to its neighboring eNBs may also be handled by the affected eNB over an interface between neighboring eNBs or, alternatively, the S1 interface.

If new TACs are introduced or old ones are removed or if a TAC is moved from one MME pool to another, then the OSS 105 must consider the new situation in terms of routing of signaling messages (locating other MME pools) over an interface between several MME pools, which in some cases, e.g. in conjunction with automatic configuration of neighbor relations (ANR) and inter-MME pool handovers, may be based on TAI/TAC. Hence, any occurrence of routing data based on TAI/TAC (used to locate the MME pool(s) owning the respective TAI/TAC) must be updated in accordance with the updated TA configuration, such that the TAI/TAC to MME pool mapping is correct.

When managing TACs, the OSS should consider the potential consequences of moving a TAC from one MME pool to another. This may make some UEs' lists of TAs span multiple MME pools. This is against general principles for TA list allocation and significantly complicates the paging procedure, since multiple MMEs (i.e. not only the serving MME) have to be involved when paging one of these UEs. Therefore, when updating the TA configuration, it is preferable not to reuse an existing TAC in a new MME pool, i.e. in essence move the TAC to a new MME pool.

If a TAC is removed during a TA configuration update, the OSS may instruct concerned network nodes to maintain any routing data based on the removed TAC for a certain time, in order to let ongoing or delayed ANR (Automatic Neighbor Relation) procedures and/or inter-MME pool handover procedures conclude.

With reference to FIG. 2, there is illustrated a signaling chart describing the steps when updating or reconfiguring tracking areas in the wireless communication network 100, as shown in FIG. 1, in accordance with solution variant 1. In the example according to FIG. 2, the steps 200-281 below may be performed. Optional steps are indicated by dashed arrows in the Figure. A black dot on the intersection between an arrow and a vertical "node" line indicates that the message (or procedure) is relayed (or forwarded) by the node.

Step 200 The base station 101 broadcasts, or sends, the old TAC in the cell 110 in the broadcast system information.

Step 210 According to some embodiments, the OSS sends instructions for preparing the update of tracking areas to the base station.

Step 211 According to some embodiments, the OSS sends instructions for preparing the update of tracking areas to the MME.

Step 212 If step 210, but not step 211, was performed, then the base station may send instructions for preparing the update of tracking areas to the MME.

Step 213 If step 211, but not step 210, was performed, then the MME may send instructions for preparing the update of tracking areas to the base station in step 213.

Step 214 In some embodiments, an optional step 214 for sending information about the TAC update to an affected neighboring base station may be performed.

Step 215 As an alternative to step 214, the OSS may in a step 215 send information about the TAC update to an affected neighboring base station.

Step 230 In an embodiment, the old and new TAC and, optionally, the expiration time of the old TAC are sent to the UE as parts of the broadcast system information, i.e. the two TACs are broadcast in parallel to the user equipment. This may be referred to as parallel TAC broadcast.

Step 250 The UE sends a delayed TA update (or reports its location) to the MME via the base station. The behavior of the UE is further elaborated below.

Step 260 The base station sends the new TAC in the system information to the UE in the cell, whose TAC has been updated (i.e. the old TAC is now removed from the system information).

Step 261 Optionally, the base station 101 sends a commit message to the MME informing that only the new TAC (and no longer the old TAC) is broadcast in the cell 110.

Step 262 Optionally, the base station 101 sends a commit message to the affected neighboring base station informing that only the new TAC (and no longer the old TAC) is broadcast the cell 110.

Step 280 In step 280, the base station 101 sends a report to the OSS, informing the OSS whether the update has been successfully performed or not. This report is preferably sent at least if step 210 was performed and possibly even if step 210 was not performed.

Step 281 In step 281, the MME 106 sends a report to the OSS. The report has a similar function as the report in step 280. This report is preferably sent at least if step 211 was performed and possibly even if step 211 was not performed.

Figure 3:
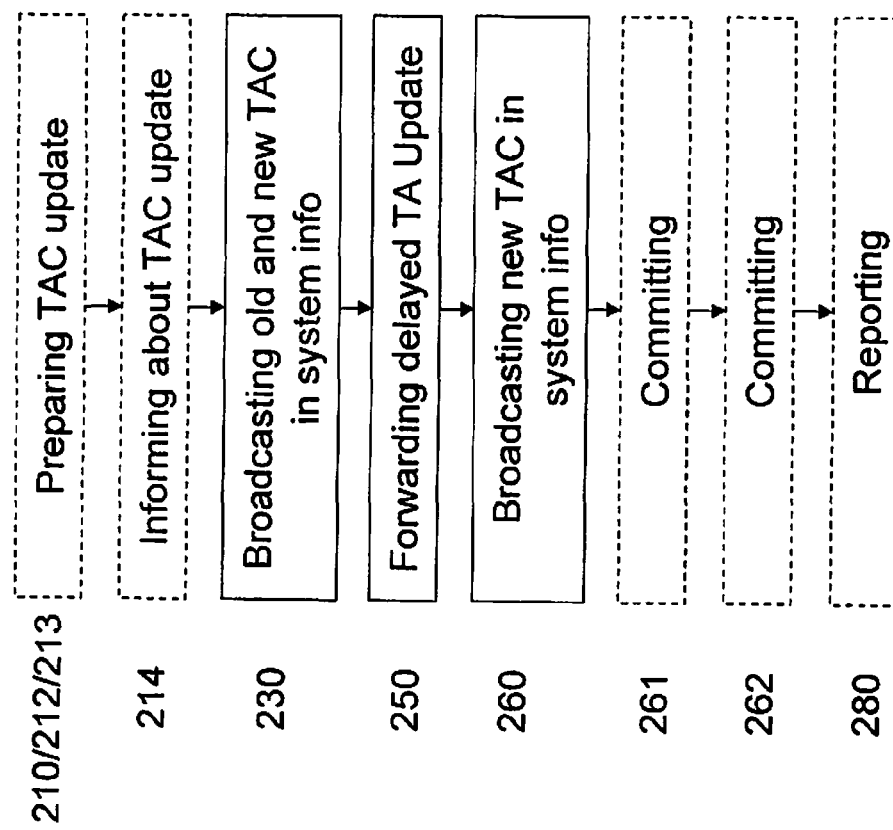
FIG. 3 shows a flow chart according to embodiments of the method in the first network node.

In FIG. 3, there is shown an exemplifying flow chart demonstrating a method performed in a first network node 101 for replacing a first area identifier A1 of a cell 110 served by the first network node 101 with a second area identifier A2 for the cell 110. The replacement of the first area identifier with the second area identifier is completed when an area identifier replacement period has elapsed. The first network node 101 is comprised in a wireless communication network 100. The following steps are performed. Optional steps are noted as such and indicated by a box drawn with a dashed line.

Step 200 Not shown in FIG. 3. The first network node 101, or the base station, sends the first area identifier A1 to a user equipment 102 in the cell 110. It may also be another base station that sends the first area identifier A1 to the UE, as is the case when the UE moves from a cell served by one base station to a cell served by another base station.

Step 210 or 213 The first network node 101 receives the second area identifier A2 from a second network node 104, 105, 106, comprised in the wireless communication network 100. It is preferred that step 210 or 213 is performed, not both.

In embodiments of the method in the first network node, the first network node further receives the area identifier replacement period (e.g. information about the start and end times or the start time and length of the area identifier replacement period). In detail, the area identifier replacement period may be sent to the first network node in step 210 or 213 as part of a tracking area code update preparation command. As a result, the area identifier replacement period may be dynamically changed. For example, longer area identifier replacement periods may be suitable if there are many mobile terminals in the cell that is to be updated, i.e. the area identifier of the cell is to be replaced.

Step 214 The eNB, or the first network node, may send information about the area identifier replacement to an affected neighboring eNB.

Step 215 The OSS may send information about the area identifier replacement to an affected neighboring eNB. It is preferred that step 214 or 215 is performed, not both.

Step 230 The first network node repeatedly sends both the first and second area identifiers, or the old and the new area identifiers, A1, A2 to the user equipment 102 during the area identifier replacement period.

In some embodiments of the method in the first network node, the first network node further sends the area identifier replacement period to the user equipment 102 during step 230. In this manner, the first network node informs any mobile terminals within the cell being updated about when the first area identifier expires. Any mobile terminals must perform tracking area update reporting (TAU) to the network before expiration of the first area identifier.

Step 250 The first network node forwards the TAU request from the UE to the second network node, in particular an MME. In the message used for forwarding the TAU request (i.e. the message in which the TAU request message from the UE is included when forwarded to the second network node) the first network node may, if needed, include the second area identifier.

Step 260 When the area identifier replacement period has elapsed, the first network node sends the second area identifier A2 to the user equipment 102, but not the first area identifier A1. As a result, the second area identifier A2 is the only area identifier associated with the cell 110.

Step 261 and 262 See above.

Step 280 This step is optional. If the second network node is an OSS, then the first network node sends a message to the second network node, the message being that only the second area identifier is sent to the user equipment. In this manner, the network is kept informed about the current status of the first network node, i.e. whether cells of the first network node are being updated or not.

While the parallel TAC broadcast is ongoing, the eNB may attempt to hand over active UEs, for which the new TAC is included in the list of forbidden TAs, to allowed neighbor cells. The eNB may allow an active UE for which the new TAC is forbidden to remain in the cell until the old TAC expires, after which its connection is aborted (unless it is successfully handed over to an allowed neighbor cell).

It may be noted that the allowed (specified) contents of broadcast system information needs to be changed in order to support the TA configuration change according to base station behavior variant 1. The system information is configured such as to allow two TACs to be broadcast in the system information in a cell: the old and the new TAC, i.e. the one being changed from and the one being changed to, respectively. In addition, an expiry time may be associated with at least the old TAC and included in the broadcast system information. An infinite expiry time, or none at all, may be associated with the new TAC. The expiry time may be expressed as an absolute time, time left until expiration of the old TAC, number of transmissions of an SU (system information Scheduling Unit) left until expiration, or a System Frame Number (SFN), which is indicated on the broadcast channel (BCH).

Figure 4:
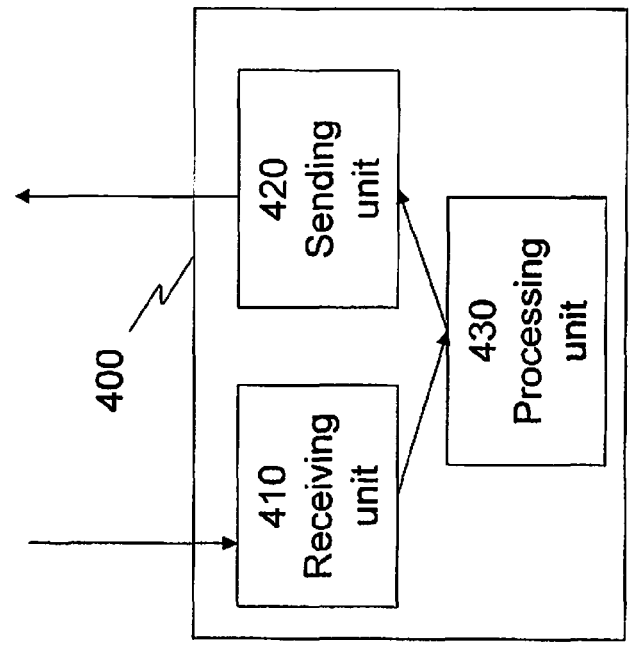
FIG. 4 shows a block diagram of an embodiment of the arrangement in the first network node, wherein the arrangement is configured to perform the steps according to FIG. 3.

In FIG. 4, there is shown a block diagram of an arrangement 400 in a first network node 101 for replacing a first area identifier A1 of a cell 110 served by the first network node 101 with a second area identifier A2. The first network node 101 is comprised in a wireless communication network 100. The arrangement comprises a sending unit 420 configured to send the first area identifier A1 to a user equipment 102 in the cell, a receiving unit 410 configured to receive the second area identifier from a second network node 104, 105, 106, comprised in the wireless communication network 100. The sending unit is further configured to repeatedly send the first and second area identifiers A1, A2 to the user equipment 102 during an area identifier replacement period, and when the area identifier replacement period has elapsed, configured to send the second area identifier A2 to the user equipment 102 and configured to cancel sending of the first area identifier A1, thereby being configured to replace the first area identifier A1 with the second area identifier A2.

Furthermore, according to some embodiments of the arrangement 400 in the first network node, the arrangement may comprise a processing unit 430 configured to handle data sent to and from the arrangement 400. For example, the processing unit 430 may keep track of the area identifier replacement period such that the arrangement may send the second area identifier to the UE at a correct point in time.

In some embodiments of the arrangement in the first network node, the receiving unit 410 is further configured to receive the area identifier replacement period (e.g. information about the start and end times or the start time and length of the area identifier replacement period). It is preferred that the area identifier replacement period is received before sending of the first and second area identifiers A1, A2.

In some embodiments of the arrangement in the first network node, the sending unit 420 is further configured to send the area identifier replacement period, e.g. in the form of an expiration time, to the user equipment 102.

In some embodiments of the arrangement in the first network node, the sending unit 420 is further configured to send a message to the second network node, wherein the message is that only the second area identifier is sent to the user equipment. The second network node may be the MME or the OSS. On one hand, if the second network node is an MME, the message is a commit message, indicating that the area identifier has been successfully replaced. On the other hand, if the second network node is an OSS, the message is a report message, indicating that an area identifier replacement has been performed.

Figure 5:
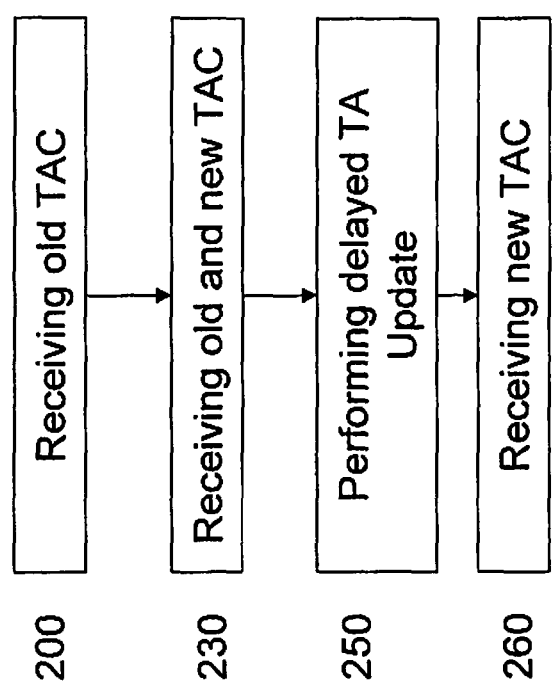
FIG. 5 shows a flow chart according to embodiments of the method in the user equipment.

Now referring to FIG. 5, there is shown a flow chart illustrating an embodiment of the method in a user equipment 102 for, during an area identifier replacement period, responding to a replacement of a first area identifier A1 of a cell 110 served by a first network node 101 with a second area identifier A2 for the cell. The replacement is completed when the area identifier replacement period has elapsed. Furthermore, the user equipment 102 is configured to store area identifiers. The first network node 101 and the user equipment are comprised in a wireless communication network 100. The user equipment is located in the cell 110. The following steps are performed. Optional steps are noted as such and indicated by a box drawn with a dashed line.

Step 200 This step is optional. The user equipment receives the first area identifier, or the old TAC.

Step 230 The user equipment receives a second area identifier, possibly in addition to the first area identifier, from the first network node.

Step 250 The user equipment sends a location report to a second network node 105 at a point in time within the area identifier replacement period. Furthermore, the first network node 101 is served by the second network node 105 and the second area identifier A2 is sent to the second network node 105 in conjunction with the location report. It may be preferred that the first network node adds the second area identifier A2 to the location report, when forwarding it to the second network node, or that the first network node sends the second area identifier A2 to the second network node. The second network node is an MME.

Step 260 The user equipment receives a list of area identifiers, based on the location report and the second area identifier, to be stored in the user equipment 102 from the second network node 105. Preferably, the list of area identifiers includes the second area identifier, or the new TAC.

If the second area identifier is equal to any one of the area identifiers in the list of area identifiers, it is not necessary to perform an area information update (TAU), i.e. report the mobile terminal's location to the network. If the second area identifier is equal to any one of the area identifiers in the list of area identifiers, the mobile terminal is allowed to reside in that cell without reporting to the network. In other words, the step 250 of sending a location report is performed only if the second area identifier, A2 is different from all area identifiers stored in the user equipment, 102.

In embodiments of the method in the user equipment, the first area identifier A1 is received from the first network node 101 and the point in time (at which the user equipment in step 250 reports its location to the MME) is at a variable point in time from reception of the second area identifier A2. In this manner, mobile terminals, located in the cell when the update began, will distribute their reporting to the network in time. As a consequence, the load on the network will be less than without such distribution in time.

In some embodiments of the method in a user equipment, the first area identifier A1 is received from a network node different from the first network node 101 and the point in time (mentioned in step 250) is at the point in time at which the user equipment 102 enters the cell 110 after the update of area information of the cell 110 has begun. Mobile terminals that enter a cell which is being updated need not wait a time period before reporting to the network, since the points in time at which the mobile terminals enter are most probably distributed in time. Instead, the mobile terminals may immediately after entering the cell send a location report as described above.

It may be preferred that the point in time is randomly located within the area identifier replacement period in some embodiments of the method in the user equipment. Thereby, the reporting from mobile terminals is randomly spread in time such as to reduce the load on the network and it is assured that TAUs are performed before expiry of the old area identifier.

In some embodiments of the method in the user equipment, the user equipment, after entering a cell 110 in which the area identifier is being updated (i.e. where the area identifier replacement period has begun but not ended) reports its location to the second network node (step 250) if any one of the first and second area identifiers A1, A2 is different from all area identifiers stored in the user equipment 102. This behavior is hereafter referred to as user equipment behavior alternative 2.

In step 200, the user equipment may, optionally, receive the area identifier replacement period from the first network node, e.g. in the shape of an expiration time associated with the first area identifier. In this manner, the area identifier replacement period may be varied according to present conditions in the network, such as the number of cells to be updated, number of units in the cells to be updated and/or number of active mobile terminals.

In the following, it is discussed how mobile terminals, or UEs, are affected by an area information update of cells associated with a first network node, or eNB. To begin with, only UEs that are present in a cell when the parallel TAC broadcast begins may be affected. A UE that is present in a cell has the TAC of the cell included in its TA list. When the parallel broadcast of TACs begins, all UEs present in the cell for which the new TAC is not included in the TA list or the area information of the user equipment must perform a tracking area update (TAU), i.e. a UE must report in which tracking area it is located to the network. However, if all affected UEs attempt to perform TAU simultaneously there will be an undesirable TAU peak, especially if this happens in several cells simultaneously, due to synchronized TAC updates. Therefore, it is desired that the resulting TAUs are spread out over the period of parallel TAC broadcast by introduction of delayed TAUs (see above).

An idle UE present in the cell (when the parallel broadcast of TACs begins) selects a random time within the time period left until expiry of the old TAC and performs TAU (unless the new TAC is already in the UE's current TA list). The MME will provide the UE with a TA list that includes the new TAC. Note that a UE that is present in the cell already when the parallel broadcast begins is synchronized with the network/MME in terms of the TA list. That is, the old TAC is included in the UE's TA list.

An active UE in the cell (which was present in the cell when the parallel broadcast of TACs began) also performs TAU (unless the new TAC is already in the UE's current TA list) after a random time within the time period left until expiry of the old TAC. Active UEs are informed of system information changes via an indication on a relevant physical downlink control channel (PDCCH). Again, it may be noted that since the UE was present in the cell (as active or idle) when the parallel broadcast of TACs began, the UE is synchronized with the network/MME in terms of the TA list. That is, the old TAC is included in the TA list of the user equipment. It would also be possible for the eNB to trigger the TAU by ordering the UE to perform an intra-cell handover or through some other more explicit command, e.g. a dedicated RRC (Radio Resource Control) message instructing the UE to perform TAU. Triggering the TAU from the eNB is not a preferable alternative. The eNB would trigger all UEs, even those which already have the new TAC in the TA list and which consequently should not have to perform a TAU. A way to circumvent this problem is to instruct the UE to conditionally perform an intra-cell handover (or explicitly instruct it to conditionally perform a TAU) only if the condition that the new TAC is not included in the UE's TA list is fulfilled. Another workaround may be to let the MMEs provide the eNB with information about the active UE's TA list status (in terms of the new TAC), so that the eNB may select which of the active UEs to trigger. Each UE's TA list may, for instance, be included in the UE context that the MME provides the eNB with for each active UE. But the preferred solution is to rely on the anyway existing mechanism that the eNB informs the active UEs of changes in the broadcast system information and then let the active UEs schedule their own TAUs. The TAU delay for active UEs can be introduced either by the eNB, which may delay its indication/message to the UE, or by the UE, which may introduce the delay after receiving the indication/message.

A UE for which the new TAC is included in the list of forbidden TAs does not perform TAU, but can still remain in the cell, in idle or active mode, until the old TAC expires. In the meantime, such idle UEs should try to find another (allowed) cell to reside in (i.e. perform cell re-selection to an allowed cell) and the eNB may attempt to handover the active UEs to allowed neighbor cells.

So far only UEs that were present in the cell when the area information update began have been considered. Movements of UEs into and between cells in conjunction with TA configuration updates must also be considered. This situation is different from when a UE is present in a cell when the parallel TAC broadcast begins in the cell. As mentioned above, when a UE enters a cell in which parallel TAC broadcast is ongoing (i.e. a cell which is currently undergoing a TAC update) the time that has elapsed since the parallel TAC broadcast began in the cell is in principle random. Thus, there is no reason for the UE to randomly delay a possible TAU. Below, two examples of behaviors for a UE that enters a cell, in which parallel TAC broadcast is ongoing, are described.

In a first example, referred to as UE behavior 1, when an idle or active UE enters a cell in which parallel TACs are broadcast, indicating an ongoing TAC update, the UE only considers the new TAC and acts accordingly. That is, if the new TAC is not included in the UE's TA list, the UE performs a TAU. Otherwise, if the new TAC is included in the UE's TA list, the UE does nothing.

In a second example, referred to as UE behavior 2, when an idle or active UE enters a cell in which parallel TACs are broadcast, indicating an ongoing TAC update, the UE considers both the old and the new TAC when determining whether a TAU is needed. If any one of the old or the new TAC is not included in the UE's TA list, the UE performs a TAU. That is, only if both the old and the new TAC are included in the UE's TA list does the UE not perform a TAU.

On average, UE behavior 2 results in that fewer cells are included when a UE is paged in conjunction with TAC updates, but a significant disadvantage is that the behavior may result in excessive TAUs. UEs that move quickly through cells that are involved in TAC updates or UEs which move back and forth across a cell border may cause frequent TAUs—many more than would normally be needed. Due to this disadvantage the intuitive decision is that UE behavior 1 is preferred.

Irrespective of whether UE behavior 1 or 2 is used, it is preferred that a UE not performs cell selection or cell re-selection to a cell in which the new TAC is included in the UE's list of forbidden TAs, unless, this cell is the only cell in which the UE can receive transmissions with an acceptable quality and provided that the old TAC is not included in the UE's list of forbidden TAs (and provided that the old TAC is still valid).

Figure 6:
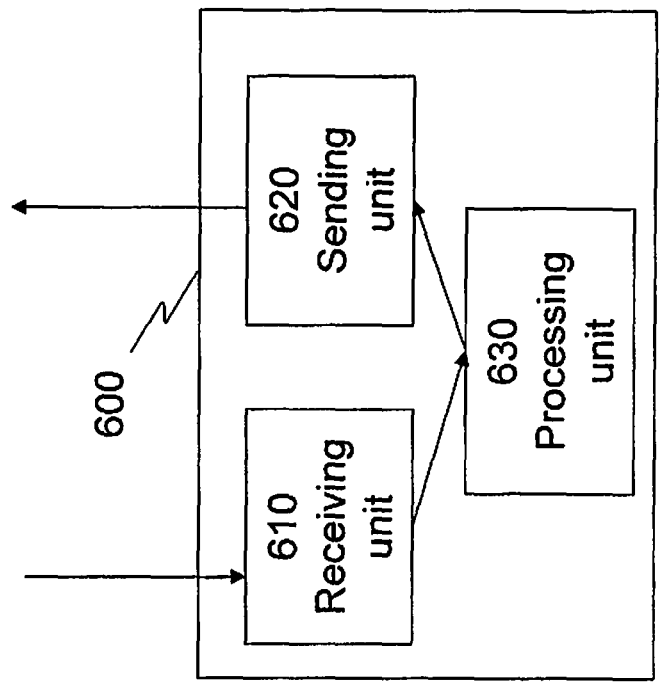
FIG. 6 shows a block diagram of an embodiment of the arrangement in the user equipment, wherein the arrangement is configured to perform the steps according to FIG. 5.

Referring to FIG. 6, there is shown an arrangement 600 in a user equipment 102 for responding to a replacement of a first area identifier A1 of a cell 110 served by a first network node 101 with a second area identifier A2. The replacement is completed when an area identifier replacement period has elapsed. The user equipment 102 is configured to store area identifiers. Furthermore, the first network node 101 and the user equipment 102 are comprised in a wireless communication network. The user equipment is located in the cell 110. The arrangement comprises a receiving unit configured to receive the second area identifier A2 from the first network node 101, a sending unit configured to send a location report to a second network node 105 at a point in time within the area identifier replacement period, wherein the first network node 101 is served by the second network node 105 and the second area identifier A2 is sent to the second network node 105, 106 in conjunction with the location report. It may be preferred that the first network node is configured to add the second area identifier A2 to the location report, when forwarding it to the second network node, or that the first network node is configured to send the second area identifier A2 to the second network node. Furthermore, the receiving unit is configured to receive a list of area identifiers to be stored in the user equipment 102 from the second network node 105, 106.

In some embodiments of the arrangement 600 in the UE, the receiving unit 610 is configured to receive the first area identifier A1 from the first network node 101 and the point in time (i.e. the point in time referred to in step 250 at which the UE reports its location to the second network node, i.e. the MME) is at a variable point in time from reception of the second area identifier A2.

In some embodiments of the arrangement 600 in the UE, the receiving unit 610 is configured to receive the first area identifier A1 from a network node different from the first network node 101 and the point in time (referred to in step 250) is at the point in time at which the user equipment 102 enters the cell 110 after the replacement of an area identifier of the cell 110 has begun.

In some embodiments of the arrangement 600 in the UE, the point in time (referred to in step 250) is randomly located within the area identifier replacement period. In this manner, the reports sent from UEs are spread out in time.

In some embodiments, if both the first and second area identifiers A1, A2 are the same as any of the area identifiers stored in the UE, there is no need for the UE to report its location to the network. Using different wording, if any one of the first and second area identifier A2 is different from all the area identifiers stored in the UE a location report shall be sent.

In some embodiments of the arrangement 600 in the UE, the sending unit 620 is further configured to send the location report only if the first and second area identifier A1 is different from all area identifiers stored in the user equipment 102.

In some embodiments of the arrangement 600 in the UE, the receiving unit 610 is further configured to receive the area identifier replacement period, e.g. in the shape of an expiration time of the first area identifier A1, from the first network node.

Figure 7:
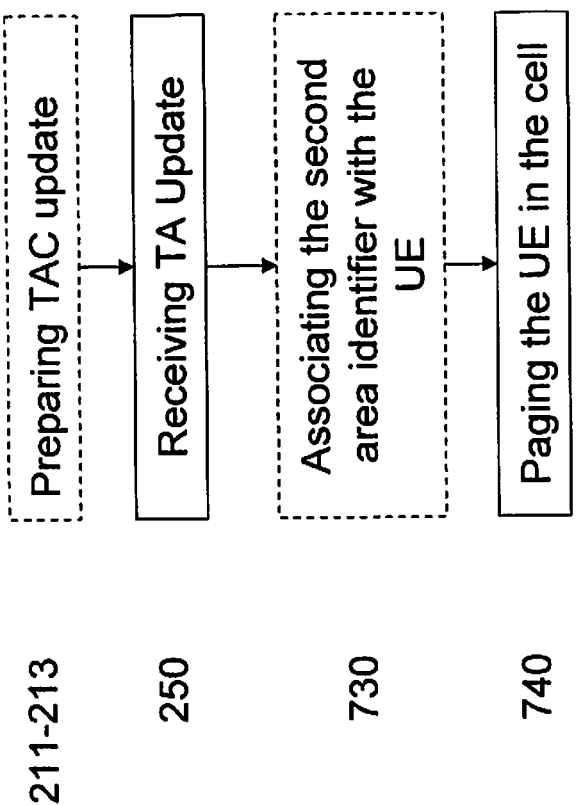
FIG. 7 shows a flow chart according to embodiments of the method in the second network node.

In FIG. 7, there is shown a flow chart of an embodiment of the method in the second network node 106 for paging a user equipment 102 during an area identifier replacement period. A replacement of a first area identifier A1 with a second area identifier A2 is completed when the area identifier replacement period has elapsed, wherein the first and second area identifiers A1, A2 are associated with a cell 110 of a first network node 101 during the area identifier replacement period. The first network node 101 is served by the second network node 105, 106. The first and second network nodes are comprised in a wireless communication network 100. The following steps are performed. Optional steps are noted as such and indicated by a box drawn with a dashed line.

Steps 211-213 These steps are optional. The function of these steps is to let the second network node receive information about a coming update of the first to the second area identifier (step 211 or step 212) and to possibly send corresponding information, e.g. in the shape of the second area identifier to the first network node 101 to prepare the first network node for the update. As a first alternative, step 211, but not steps 212 and 213, is performed (in which case step 210, which does not involve the second network node, is also performed). As a second alternative, 212 is performed (in which case it was preceded by step 210, which does not involve the second network node), but steps 211 and 213 are not performed. As a third alternative, steps 211 and 213 are performed, but not step 212 (and not step 210, which does not involve the second network node).

Step 250 The second network node 106 receives a location report from the user equipment, wherein the second area identifier is received in conjunction with the location report. Expressed differently, the UE sends a tracking area update request (performs TAU) to the first network node, which adds information about the second area identifier. The information about the second area identifier may then be sent (or forwarded) together with or as a part of the location report to the second network node, which is an MME. The second area identifier is included in the list of area identifiers associated with the user equipment by the second network node (i.e. it creates a TA list including the new TAG). Next, the second network node provides (or sends via the first network node) the updated area identifiers (i.e. the new TA list) to the UE.

Step 730 This step is optional. Provided that the area identifier replacement period was still ongoing when the second network node received the second area identifier from the user equipment in step 250 (i.e. when the user equipment performed TAU), the second network node associates an indication with the user equipment, such as to keep track of which UEs are synchronized with the area identifier replacement. A synchronized UE is a UE that has sent a location report to the second network node, i.e. performed TAU (or Attach procedure), after the beginning of the area identifier replacement period.

Step 740 When the network needs to page the user equipment, the second network node 106 pages the user equipment in the cell if either of a first and a second set of conditions are fulfilled. When applying the first set of conditions (which may be applied if UE behavior 1 is used), the second network node pages the user equipment if the step of receiving the second area identifier from the user equipment (i.e. step 250) occurred before the area identifier replacement period began (and before the step of paging) (i.e. if the user equipment is not synchronized with the area identifier replacement) and if anyone of the first and second area identifiers is stored in the list of area identifiers (i.e. if either the first or the second TAC (or both) is included in the TA list associated with the user equipment). When applying the second set of conditions, the second network node pages the user equipment if the step of receiving the second area identifier from the user equipment (i.e. step 250) occurred during the area identifier replacement period and before the step of paging (i.e. if the user equipment is synchronized with the area identifier replacement), and if the second area identifier is stored in the list of area identifiers (i.e. if the second TAC is included in the TA list associated with the user equipment).

In embodiments of the method in the second network node, the second network node may apply an alternative variant of the above first set of conditions (if user equipment behavior 2 is used), such that the second network node pages the user equipment if the second network node received the second area identifier A2 in step 250 before the area identifier replacement period began (and before the step of paging) (i.e. if the user equipment is not synchronized), and if the first area identifier A1 is stored in the list of area identifiers (i.e. if the first TAC is included in the TA list associated with the user equipment). In this manner, user equipment, employing user equipment behavior 2, may be paged in a correct and efficient manner. See discussion below.

In embodiments of the method in the second network node, the step of paging the user equipment during the area identifier replacement period is further performed if the step of receiving occurred after beginning of the area identifier replacement period (i.e. the user equipment is synchronized), and if the second area identifier is stored in the list of area identifiers. In this case, the second network node has received a location report from the user equipment which made the user equipment synchronized with the area identifier replacement. As a result, it is easier for the second network node to determine which cells the user equipment may be located in. Thus, the second network node only pages the user equipment in those cells, i.e. cells associated with the second area identifier.

Figure 8:
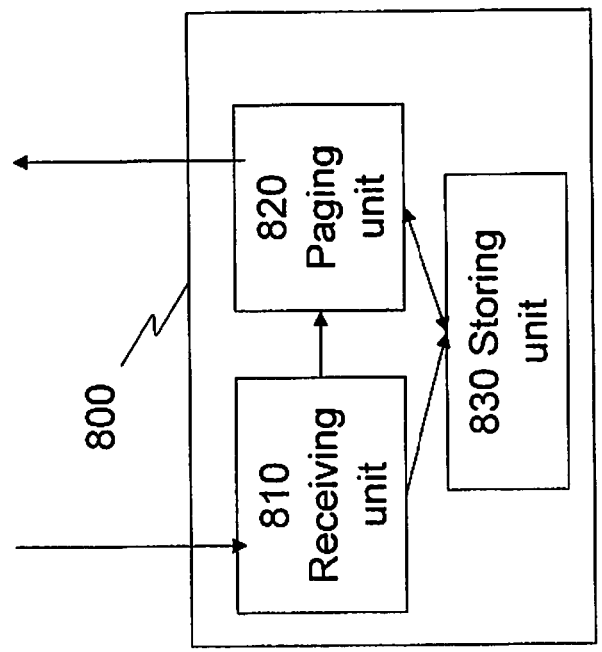
FIG. 8 shows a block diagram of an embodiment of the arrangement in the second network node, wherein the arrangement is configured to perform the steps according to FIG. 7.

In FIG. 8, there is shown a block diagram of an arrangement 800 in a second network node 106 for paging a user equipment 102 during an area identifier replacement period. A replacement of a first area identifier A1 with a second area identifier A2 is completable when the area identifier replacement period has elapsed, wherein the first and second area identifiers A1, A2 are associatable with a cell 110 of a first network node 101 during the area identifier replacement period. The first network node 101 is servable by the second network node 106. The first and second network nodes are comprised in a wireless communication network 100. Furthermore, the arrangement comprises a receiving unit 810 configured to receive a location report from the user equipment, wherein the second area identifier is receivable in conjunction with the location report, a storing unit 830 configured to store area identifiers, including the second area identifier A2, in the second network node 106, wherein the area identifiers are associated with the user equipment 102, and a paging unit 820 configured to page the user equipment 102 in the cell 110 during the area identifier replacement period, if the location report was received before beginning of the area identifier replacement period, and if any one of the first and second area identifiers A1, A2 is stored in the list of area identifiers.

In some embodiments of the arrangement 800 in the second network node, the paging unit 820 is further configured to page the user equipment during the area identifier replacement period only if the first area identifier A1 is stored in the list of area identifiers. In this manner, user equipment, employing user equipment behavior 2, may be paged in a correct and efficient manner. See discussion below.

In some embodiments of the arrangement 800 in the second network node, the paging unit 820 is further configured to page the user equipment 102 in the cell 110 during the area identifier replacement period, if the location report was received after the beginning of the area identifier replacement period, and if the second area identifier A2 is stored in the list of area identifiers.

Here follows a discussion of the paging strategy for synchronized and unsynchronized tracking area configuration.

From the MME's point of view the UEs that may be affected by the area configuration update are not only those that are actually present in a cell undergoing a TAC update, but all UEs that, judging from the information available to the MME, possibly may be present in a cell that is undergoing a TAC update. This means that if cell X is changing from TAC=1 to TAC=2, then all UEs, which, at the time the parallel broadcast of the two TACs begins in cell X, have TAC=1 included in their TA list are (from the MME's perspective) potentially present in cell X. Of the UEs that are potentially present in cell X, those that also have the new TAC, i.e. TAC=2, included in their TA list are not affected by the TAC update. This means that from the MME's perspective, the UEs that are affected by the TAC update in cell X are those of its served UEs that have TAC=1 (the old TAC), but not TAC=2 (the new TAC) included in their TA list.

The notion of affected and not affected UEs determines the MME's paging strategy. The paging strategy also depends on whether each cell's TAC update is independent of other cells' updates, i.e. whether the TAC updates in different cells are synchronized or not.

During unsynchronized TAC updates the TAC update procedure in each cell occurs independently of TAC updates in other cells. TAC updates may be ongoing in parallel cells, but the procedures may be shifted (partly overlapping) in time. For the MME, this means that it must consider each cell separately when determining its paging strategy.

A straightforward approach for how to select the cells in which to page a UE is to page the UE in all cells in which either the old TAC (i.e. the one being changed from) or the new TAC (i.e. the one being changed to) is included in the UE's TA list. This is a simple, but not very efficient strategy, because it will result in that the UE is paged in cells in which the MME could deduce from available information (if it used a more clever strategy) that the UE cannot be located. A paging strategy which economizes better with the radio resources is preferred.

The following is a conceptual description of the MME's behavior, when a more resource efficient strategy is used.

For each of its served UEs the MME maintains a timestamp indicating when the UE performed its latest TAU. This includes regular TAUs, periodic TAUs and any unsolicited update of the UE's TA list from the MME (e.g. during an Attach procedure). The timestamp is denoted TAU timestamp and its value is referred to as the UE's last-TAU-time.

When the MME is to page a UE, it must select the cells to be included in the page. The MME then classifies the cells into three different categories and use different selection criteria for the different categories. The three cell categories are:

Category 1 cells: Cells which are undergoing a TAC update (i.e. the cells in which parallel TAC broadcast is ongoing) and in which the TAC update (i.e. parallel TAC broadcast) started after the UE's last-TAU-time.

Category 2 cells: Cells which are undergoing a TAC update (i.e. the cells in which parallel TAC broadcast is ongoing) and in which the TAC update (i.e. parallel TAC broadcast) started before the UE's last-TAU-time.

Category 3 cells: Cells which are not undergoing a TAC update.

The MME uses the following criteria when selecting the cells to page the UE in:

Out of the category 1 cells the MME selects different cells depending on whether UE behavior 1 or 2 is used.

If UE behavior 1 is used, the MME selects the cells in which either the old or the new TAC is included in the UE's TA list. (In other words: A category 1 cell is included in the page if either its old or new TAC is included in the UE's TA list.)

If UE behavior 2 is used, the MME selects the cells in which the old TAC is included in the UE's TA list. (In other words: A category 1 cell is included in the page if its old TAC is included in the UE's TA list.)

Out of the category 2 cells the MME selects the cells in which the new TAC is included in the UE's TA list. (In other words: A category 2 cell is included in the page if its new TAC is included in the UE's TA list.) This selection criterion is the same for both UE behavior 1 and 2.

Out of the category 3 cells the MME selects the cells in which the only TAC is included in the UE's TA list (i.e. regular paging behavior). (In other words: A category 3 cell is included in the page if its only TAC is included in the UE's TA list.) This selection criterion is the same for both UE behavior 1 and 2.

The MME may not have to perform the complete cell selection procedure itself. Instead it may only determine which eNBs are to perform the page and then send the UE's TA list and last-TAU-time as part of the page instructions to the eNBs. Each eNB would then determine which of its cells (note that an eNB can have one or more cells) that fulfill the selection criteria.

Obviously UE behavior 2 on average results in that fewer cells are included in a page, but UE behavior 1 is still preferred, as mentioned above.

The following is another conceptual description of the paging strategy during unsynchronized TAC updates, which results in the same externally observable behavior (i.e. the same cells are included in the page) for UE behavior 1. Note that this conceptual description is equivalent to the one above only if UE behavior 1 is used, but since UE behavior 1 is preferred, it may still be useful to present this conceptual description as an example.

When the parallel broadcast of TACs begins in a cell, the MME makes a list of all of its served UEs that (from the MME's perspective) are affected by the TAC update, i.e. the UEs which have the old TAC, but not the new TAC included in the TA list. Note that whether or not a UE that has the new TAC included in the TA list (in addition to the old TAC) is included in the list of affected UEs in practice does not affect which cells the MME pages the UE in. Choosing not to include such UEs, however, results in shorter lists of affected UEs, which may be an advantage. Note that the MME creates such a list on a per cell basis, i.e. one list for each cell that is undergoing a TAC switch (because this behavior is adapted to unsynchronized TAC updates).

When paging a UE in the list of affected UEs, the MME considers the concerned cell to be a part of the TA with the old TAC, i.e. the cell is one of the cells that the UE is paged in (since all UEs in the list of affected UEs have the old TAC included in their TA lists).

Whenever a UE that is included in the list of affected UEs (for any cell) performs a TAU (irrespective of in which TA the TAU is performed and which TAs the MME includes in the TA list it provides the UE with), the MME removes the UE from the list of affected UEs (i.e. from all the lists of affected UEs that the UE may be included in).

When paging a UE that is not included in the list of affected UEs for the cell, the MME considers the cell to be a part of the TA with the new TAC, i.e. the MME pages the UE in the cell only if the new TAC is included in the UE's TA list.

When the old TAC expires in the cell and the parallel TAC broadcast ends, the MME removes the entire list of affected UEs for the cell. Thereafter the MME considers the cell to be a part of the TA with the new (and now only) TAC for all UEs.

The MME maintains this behavior and paging strategy for each cell that is undergoing a TAC update, i.e. in which parallel TAC broadcast is ongoing.

During synchronized TAC updates a TA configuration change is implemented simultaneously across all affected cells, i.e. the beginning and end of parallel TAC broadcast is synchronized for all affected cells. The paging strategy for synchronized TAC updates is described below.

Also in this case one can use the straightforward strategy of paging a UE in all cells in which either the old TAC (i.e. the one being changed from) or the new TAC (i.e. the one being changed to) is included in the UE's TA list. In essence this would mean that the UE is paged in the union of the TA list's representation in the old and the new TA configuration. However, also for synchronized TAC updates a more resource efficient strategy is preferred, which is described below.

The same conceptual paging strategy as for unsynchronized TAC updates can be used also in this case, but the fact that the TAC update in all involved cells begin at the same time allows a simpler approach.

The MME does not have to continuously maintain a TAU timestamp for each UE. Instead, when the synchronized TAC update (i.e. the parallel TAC broadcast) begins, the MME marks all its served UEs as "not synchronized with the new TA configuration". (It would suffice to mark every UE which in its TA list has at least one old TAC, i.e. a TAC that is being changed from in at least one cell, but it is simpler to mark all UEs and this will produce the same end result.) The indication of whether or not a UE is synchronized with the new TA configuration is equivalent to an indication of whether the UE performed its last TAU (or otherwise received a new TA list from the MME) before or after the beginning of the TAC update (i.e. the parallel TAC broadcast). Hence, it is essentially a simplified version of the TAU timestamp and it is used in principle for the same purpose.

Subsequently, when a UE performs TAU (or is otherwise allocated a new TA list from the MME), the MME "unmarks" the UE (or marks it as "synchronized with the new TA configuration"). When the synchronized TAC update is concluded (i.e. when the parallel TAC broadcast ends), the MME "unmarks" all its served UEs (or marks them as "synchronized with the new TA configuration").

When selecting the cells for a page, only two cell categories are relevant in this case:

Category A cells: Cells which are undergoing a TAC update (i.e. the cells in which parallel TAC broadcast is ongoing).

Category B cells: Cells which are not undergoing a TAC update.

When paging a UE which is marked as "not synchronized with the new TA configuration", the MME selects the cells for the page according to the following criteria:

Out of the category A cells the MME selects different cells depending on whether LIE behavior 1 or 2 is used. If UE behavior 1 is used, the MME selects the cells in which either the old or the new TAC is included in the UE's TA list. (In other words: A category A cell is included in the page of a "marked" UE if either its old or new TAC is included in the UE's TA list.) Note that paging a marked UE in a category A cell is equivalent to paging a UE in a category 1 cell in conjunction with unsynchronized TAC updates. If UE behavior 2 is used, the MME selects the cells in which the old TAC is included in the UE's TA list. (In other words: A category A cell is included in the page of a "marked" UE if its old TAC is included in the UE's TA list.)

Out of the category B cells the MME selects the cells in which the only TAC is included in the UE's TA list (i.e. regular paging behavior). (In other words: A category B cell is included in the page of a "marked" UE if its only TAC is included in the UE's TA list.) This selection criterion is the same for both UE behavior 1 and 2. Note that paging a marked or unmarked UE in a category A cell is equivalent to paging a UE in a category 3 cell in conjunction with unsynchronized TAC updates.

When paging a UE which is not marked as "not synchronized with the new TA configuration" (e.g. "unmarked" or marked as "synchronized with the new TA configuration"), the MME selects the cells for the page according to the following criteria:

Out of the category A cells the MME selects the cells in which the new TAC is included in the UE's TA list. (In other words: A category A cell is included in the page of an "unmarked" UE if its new TAC is included in the UE's TA list.) This selection criterion is the same for both UE behavior 1 and 2. Note that paging an unmarked UE in a category A cell is equivalent to paging a UE in a category 2 cell in conjunction with unsynchronized TAC updates.

Out of the category B cells the MME selects the cells in which the only TAC is included in the UE's TA list (i.e. regular paging behavior). (In other words: A category B cell is included in the page of an "unmarked" UE if its only TAC is included in the UE's TA list.) This selection criterion is the same for both UE behavior 1 and 2 and it is the same as when the UE to be paged is "marked".

The MME may not have to perform the complete cell selection procedure itself. Instead it may only determine which eNBs are to perform the page and then send the UE's TA list and "marked"/"unmarked" status as part of the page instructions to the eNBs. Each eNB would then determine which of its cells that fulfill the selection criteria.

Also for this case, UE behavior 2 on average results in that fewer cells are included in a page, but UE behavior 1 is still preferred.

The following is another conceptual description of the paging strategy during synchronized TAC updates, which results in the same externally observable behavior (i.e. the same cells are included in the page) for UE behavior 1. Note that this conceptual description is equivalent to the one above only if UE behavior 1 is used, but since UE behavior 1 is preferred, it may still be useful to present this conceptual description as an example.

This conceptual description has certain similarities with the conceptual description of the paging strategy in the case of unsynchronized TAC updates, but when the cells' TAC updates are synchronized, the MME does not have to create and maintain lists of affected UEs per cell. Instead, when the TAC update (i.e. the parallel TAC broadcast) begins, the MME creates a list of affected UEs for each old TAC, i.e. for each TAC that is being changed from in at least one of the affected cells. A list of affected UEs for an old TAC should, when created, include every UE that the MME serves, which has the concerned old TAC included in its TA list.

Whenever a UE that is included in the list of affected UEs (for any TAC) performs a TAU (or otherwise receives a new TA list from the MME) (irrespective of in which TA the TAU is performed and which TAs the MME includes in the TA list it provides the UE with), the MME removes the UE from all lists of affected UEs.

When selecting the cells to page a UE in, the MME uses the following criteria:
  For every TAC that is included in the UE's TA list:
    The MME always selects all non-TAC updating cells with the concerned TAC (which is then the cells' only TAC). (This is simply regular behavior.)
    The MME also selects all cells that are undergoing a TAC update (i.e. in which parallel TAC broadcast is ongoing) in which the concerned TAC (i.e. a TAC in the UE's TA list) is the new TAC (i.e. the TAC being changed to).
    If the UE is included in the list of affected UEs for the concerned TAC (i.e. a TAC in the UE's TA list), then the MME also selects the cells which have the concerned TAC as the old TAC (i.e. the TAC being changed from).
When the old TACs expire in the cells and the parallel TAC broadcast ends, the MME removes the entire list of affected UEs for all old TACs and reverts to the regular paging behavior.

In FIG. 9, there is shown a combined signaling and flow chart, in which a further embodiment of the method in the wireless communication network 100 is illustrated. In the Figure, a dashed arrow indicates that the message (or procedure) is optional. A black dot on the intersection between an arrow and a vertical "node" line indicates that the message (or procedure) is relayed by the node. In this embodiment, the behavior of the first network node (referred to as base station behavior variant 2) differs from the behavior of the first network node in the example above. The initial steps 200, 210, 211, 212, 213, 214, 215 have been described in conjunction with FIG. 2. For the sake of simplicity, these explanations have been omitted here.

Step 235 The first network node sends the second (or new) TAC to the user equipment. A difference from base station behavior 1 (i.e. the example above) is that the first network node does not keep sending the first (or old) TAC to the user equipment in parallel with the second (or new) TAC. This step is also the start of a transient TAC update period (or area identifier replacement period) during which both the first (or old) TAC and the second (or new) TAC are valid (even though only the second (or new) TAC is sent to the user equipment).

Step 250 This step has been described above in conjunction with FIG. 2. It is, therefore, omitted here.

Step 265 The transient TAC update period (or the area identifier replacement period) ends. As a result, the first (or old) TAC is no longer valid.

The final steps 261, 262, 280, 281 have been described in conjunction with FIG. 2. For the sake of simplicity, these explanations have been omitted here.

Figure 10:
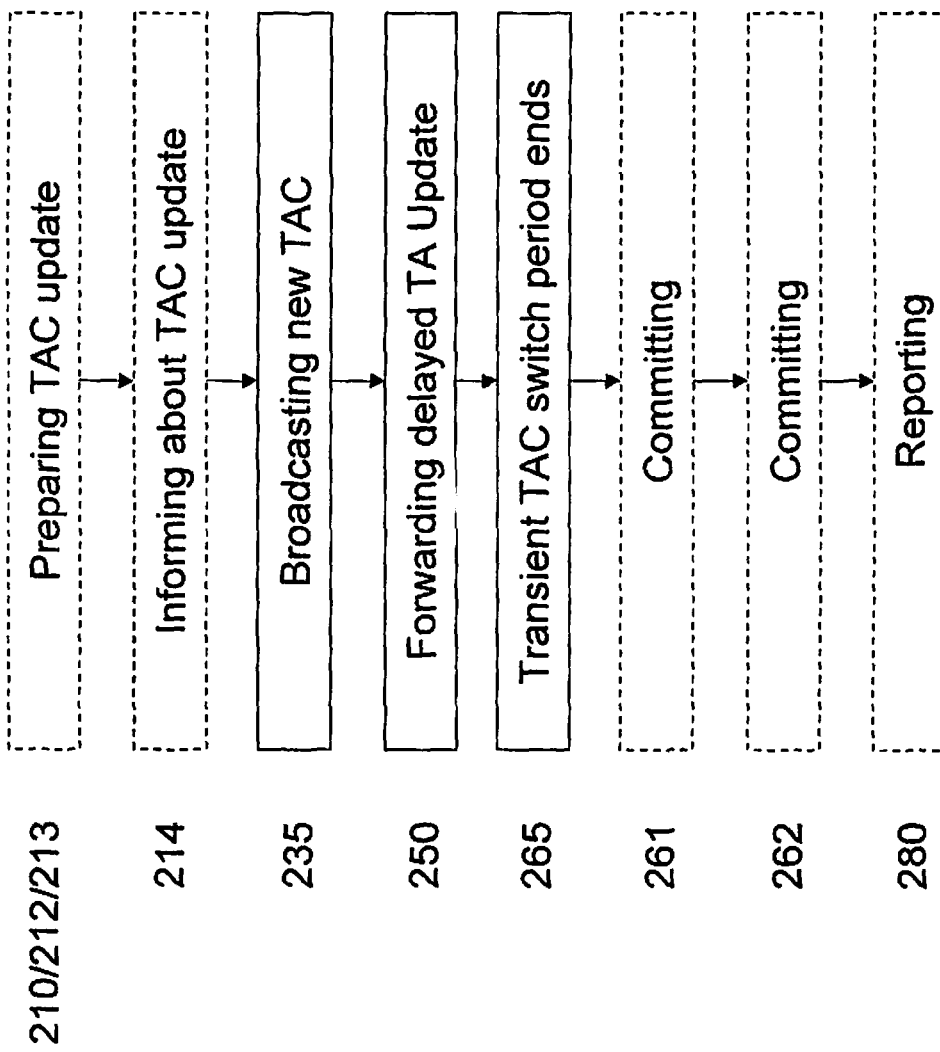
FIG. 10 shows a flow chart according to a further embodiment of the method in the first network node for updating area information.

In FIG. 10, there is shown a flow chart demonstrating another embodiment of a method in a first network node (101) for replacing a first area identifier (A1) of a cell (110) with a second area identifier (A2) of the cell (110). Reference is made to FIG. 3, since the embodiment in FIG. 10 is similar to the embodiment shown is FIG. 3, for description of elements, parts, conditions or steps that are not described here. The following steps are performed.

Steps 210, 212, 213 and 214 See above.

Step 235 The first network node sends the second area identifier A2 to the user equipment 102 during the area identifier replacement period (or a transient update period). During this transient update period both the first area identifier A1 and the second area identifier A2 are valid, even though only the second area identifier A2 is sent to the user equipment.

Step 250 See above.

Step 265 The area identifier replacement period (or transient update period) ends, which means that the first area identifier A1 is no longer valid. When the area identifier replacement period (or the transient update period) has elapsed, all UEs (affected by the area information update) must have performed TAU.

Steps 261, 262 and 280 See above.

The behavior of the first network node or the eNB according to the above is referred to as base station behavior variant 2. The base station behavior variant 2, which is the preferred variant, may be implemented without changes in the LTE radio interface, e.g. no new information has to be allowed in the broadcast system information. It should, however, be understood that a combination of the two manners may be applied by the man skilled in the art.

The most significant difference between solution variant 1 and solution variant 2 is that in solution variant 2 the parallel broadcast of the old and the new area identifiers (TACs) during the area identifier replacement period is omitted. The area identifier replacement period is, however, still used (although in some embodiments it is only implicitly known to the affected user equipments) in the sense that both the old and the new area identifiers are valid during this transient update period, even though only the new area identifier is broadcast in the system information during this transient period.

Another significant difference between solution variant 1 and solution variant 2 is that in the embodiments of solution variant 2, where the area identifier replacement period is not explicitly indicated to the affected user equipments, the affected user equipments, i.e. the user equipments that are present in a cell undergoing an area identifier update when the area identifier replacement period begins, do not detect the area information update from the initiation of parallel broadcast of area identifiers, but from the fact that the area identifier has changed between two broadcast instances of the system information. The eNB may also indicate to idle UEs via a page message and to active UEs via an indication on a signaling channel that the system information is changed).

The area identifier replacement period, in particular its length, may, in solution variant 2, be fixed, e.g. standardized or preconfigured (in the MMEs and the UEs and possibly in the eNBs). This standardized or preconfigured data would be used in the MME when determining for how long to use the modified paging strategy and in the UE it would set an upper limit for the random delay of TAUs. In the eNBs it could govern the time the eNB allows active UEs, for which the new TAC is forbidden, to remain in the cell. As a slightly more flexible alternative the area identifier replacement period could be semi-statically configurable in the network and transferred to the user equipments during the Attach procedure (i.e. when a user equipment initially registers with the network). Yet an alternative is to indicate the length of the transient period (and possibly also its start time) as a permanent parameter (or two permanent parameters) in the broadcast system information (i.e. not only present during an area identifier replacement). The area identifier replacement period could also be indicated by an optional parameter (or optional parameters) in the system information, which would be included in the system information only during the identifier replacement period and some time before the start of the area identifier replacement period. If any of these latter alternatives (where the area identifier replacement period is indicated in the broadcast system information) is used, the parameter(s) could be changed prior to a planned area information update (TAC update), which would make the transient update period equally flexible as in solution variant 1.

As in solution variant 1 the OSS initiates the TA configuration changes after determining that it is beneficial to change to a new TA configuration. Also as in solution variant 1 the OSS prepares either both affected eNBs and MMEs or only affected eNBs or MMEs (which then inform each other across the S1 interface) and possibly also affected eNBs' neighbor eNBs. A difference from solution variant 1 is that the eNB does not have to be prepared with an expiry time for the old TAC, provided that the length of the TAC update period is standardized or preconfigured in the eNB. However, if the possibility to indicate the TAC update period (or the area identifier replacement period) in the system information is used, the OSS could adapt the transient TAC update period to each particular TA configuration update, by instructing the (affected) eNBs to change the TAC update period length in the system information some time before the TA configuration update is actually executed.

The MME's behavior in terms of paging strategy is in principle the same as in solution variant 1 (for both synchronized and unsynchronized TA configuration updates). A difference is that the transient time period during which the MME uses the modified paging strategy for affected UEs does not coincide with any parallel TAC broadcast in affected cells, but is instead governed by a parameter which is either standardized, semi-statically configured or dynamically configured (e.g. from the OSS) together with the other TA configuration update preparation data (possibly valid only during that particular TA configuration update).

Figure 11:
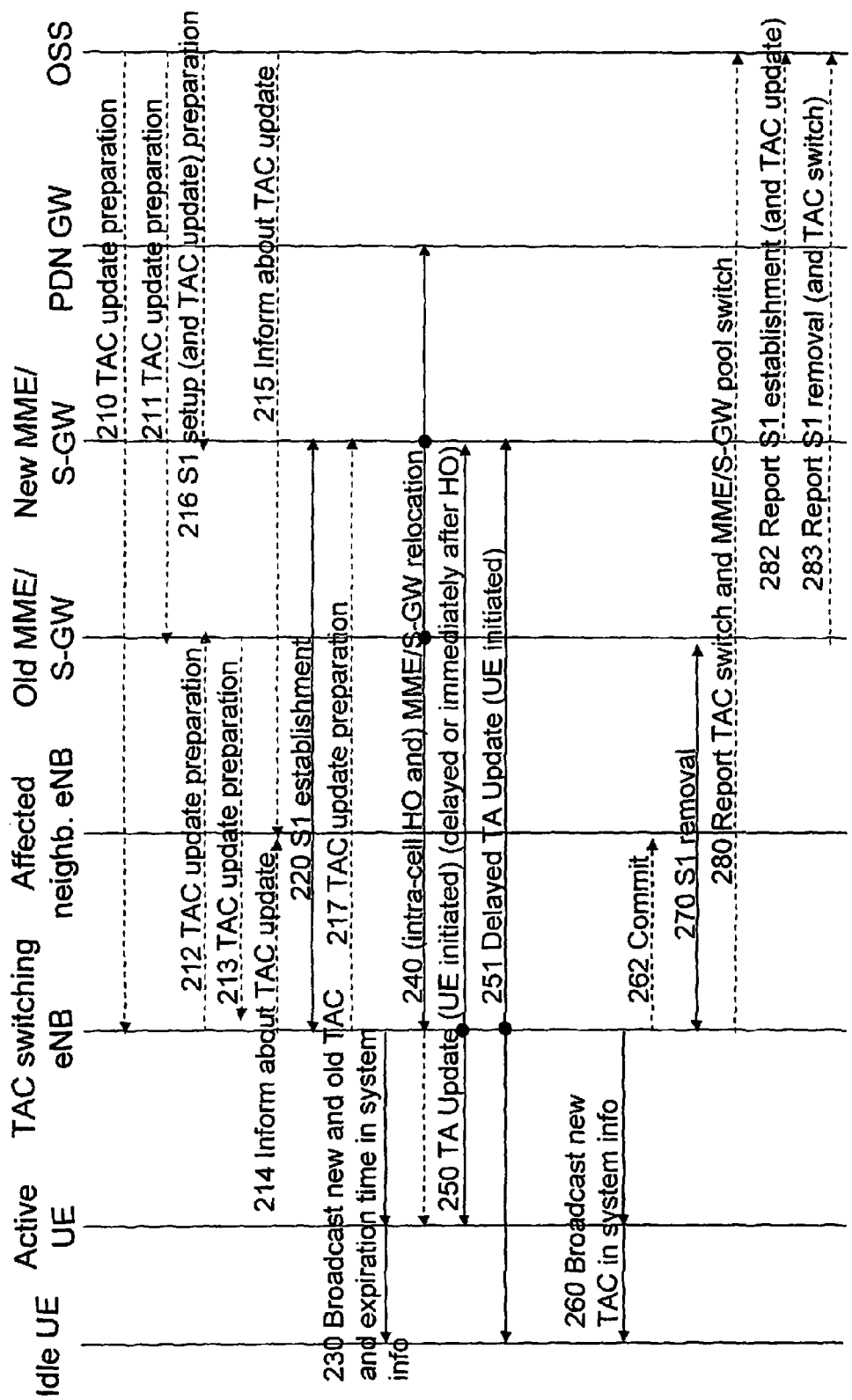
FIG. 11 shows a signaling chart according to some embodiments of the method in the wireless communication network of FIG. 1 for updating area information.
Figure 13:
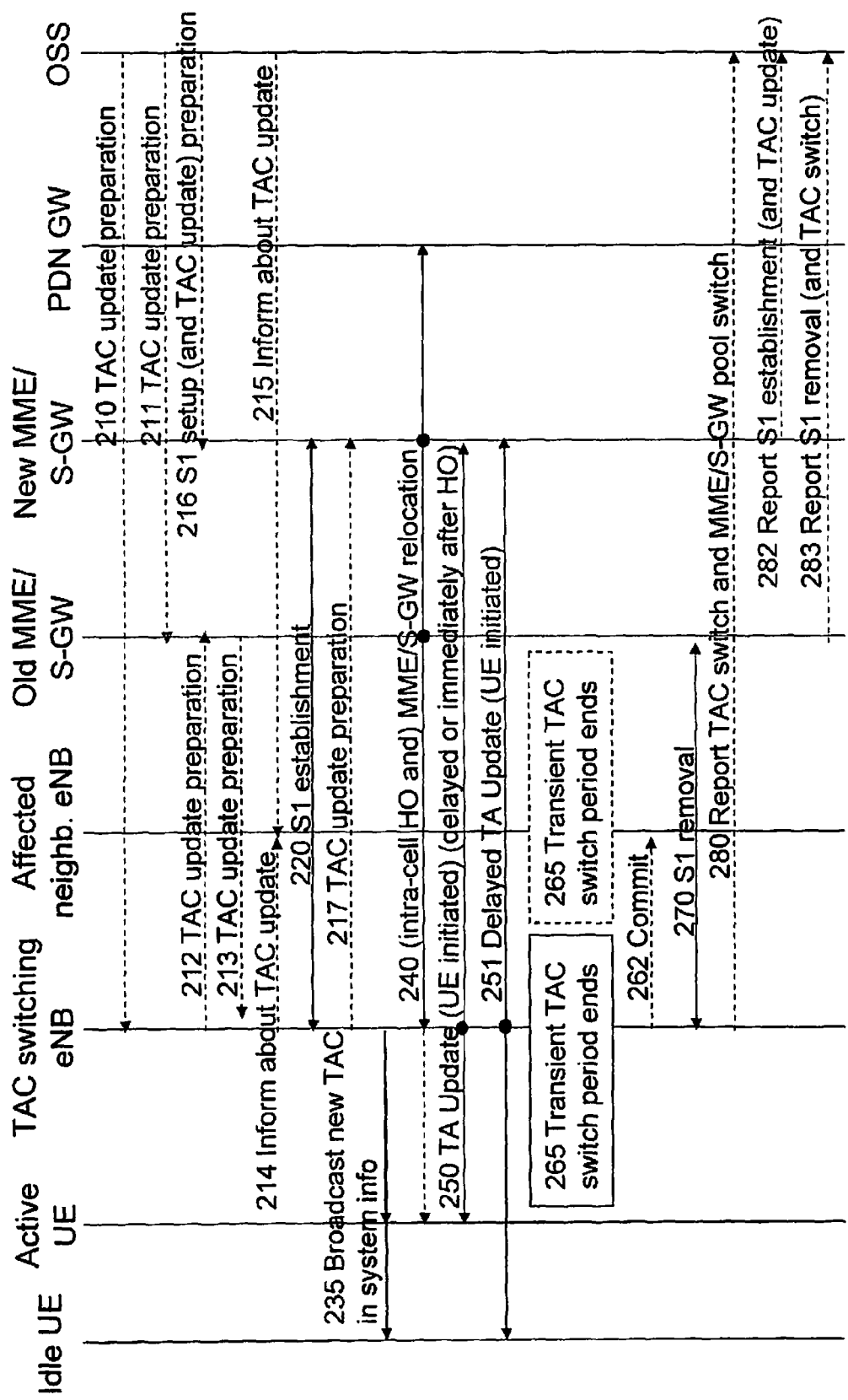
FIG. 13 shows a combined signaling and flow chart of the wireless communication network of FIG. 1 according to some embodiments of a method in the wireless communication network for updating area information.

With reference to FIGS. 11 and 13, there are shown signaling charts for an area configuration update requiring an MME pool switch for solution variant 1 and 2, respectively. Again, it may be noted that a dashed arrow means that the message (or procedure) is optional. A black dot on the intersection between an arrow and a vertical "node" line indicates that the message (or procedure) is relayed by the node. In FIGS. 11 and 13, there is a further MME, referred to as the new MME, which is an MME in the MME pool that the eNB switches to. Furthermore, in FIG. 11 PDN GW is abbreviated for Packet Data Network Gateway.

As illustrated in FIG. 11, the following steps are performed. Optional steps are noted as such and indicated by dashed arrows.

Step 210-215 These steps have previously been explained and, hence, explanations of these steps are omitted here for the sake of simplicity.

Step 216 This step is optional and is preferably performed if step 217 is not performed. The OSS sets up and prepares the new MME for handling the eNB that is undergoing an area update and needs to switch to another MME (or MME pool).

Step 220 An S1 interface is established between the present eNB and the new MME pool.

Step 217 This step is optional and is preferably performed if step 216 is not performed. The eNB undergoing an area update and which needs to switch to another MME (or MME pool) prepares the new MME.

Step 220 The eNB establishes the S1 interface to the new MME (actually to each MME in the new MME pool).

Step 230 See description above.

Step 240 This is the actual step of switching the eNB to the new MME. An intra-cell handover and an MME relocation of the eNB is performed.

Step 250 If the UE is active, the UE performs TAU, i.e. reports its location, to the MME via the eNB.

Step 251 The UE, if idle, performs TAU.

Steps 260 and 262 have been described above. For the sake of simplicity, description of these steps is omitted here.

Step 270 The S1 interface between the eNB, undergoing an MME (pool) switch and the old MME (actually the S1 interfaces to each MME in the old MME pool), being switched from, is removed.

Step 280 For the sake of simplicity, it is referred to the above description of this step. However, in addition to the above description, the report from the eNB may contain information about the performed MME/S-GW (Mobility Management Entity/Serving Gateway) pool switch.

Step 282 This step is optional. The new MME reports establishment of the S1 interface to the OSS. In addition, the new MME may report successful update of area identifiers.

Step 283 This step is optional. The old MME reports removal of the S1 interface to the OSS. In addition, the old MME may report successful update of area identifiers.

Figure 12:
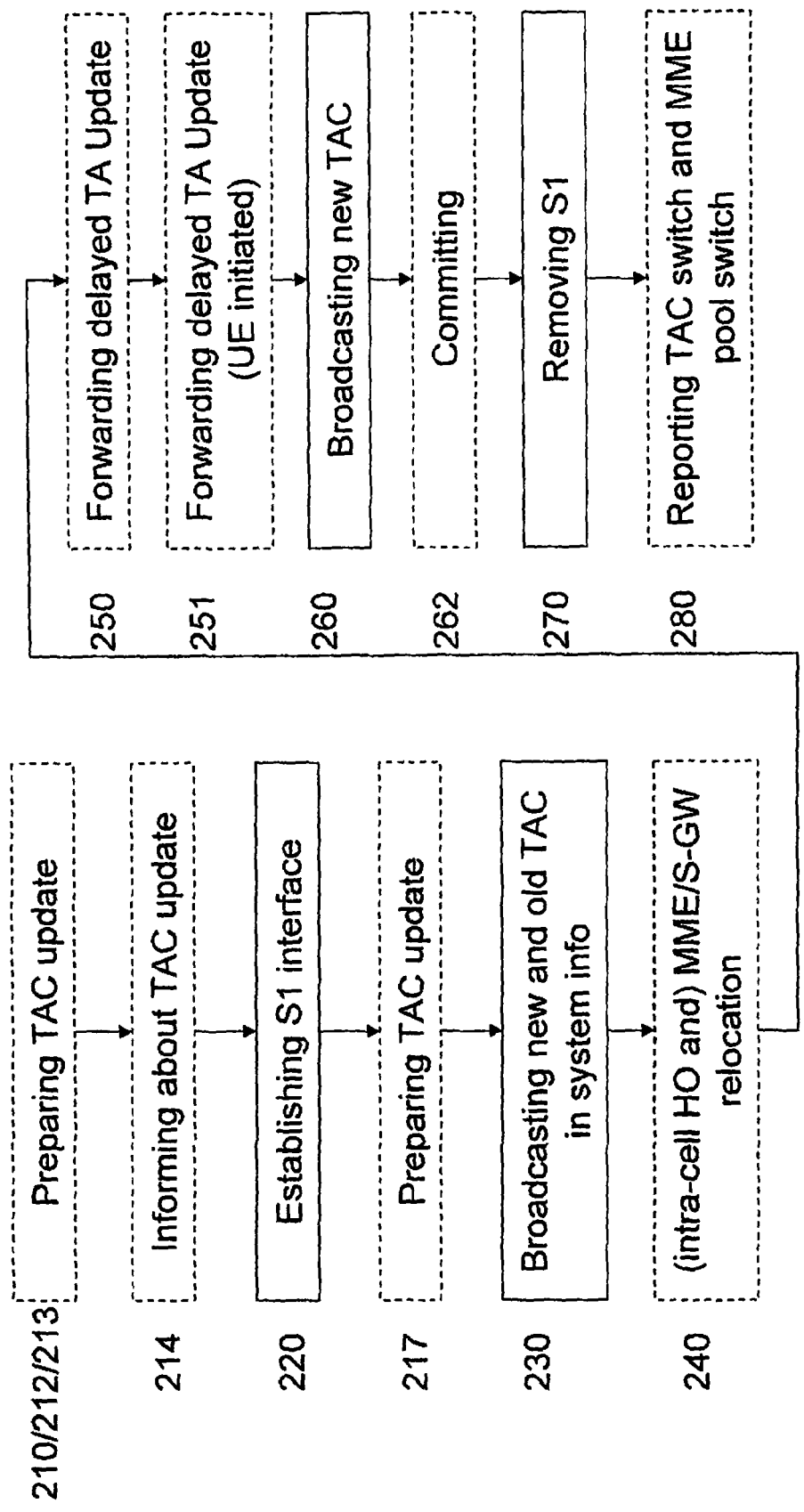
FIG. 12 shows a flow chart according to a method in the first network node for updating of area information according to FIG. 11.

In FIG. 12, there is shown a flow chart of a method in a first network node, employing eNB behavior variant 1, for updating of area information (i.e. replacement of area identifier(s)), wherein the update of area information requires the first network node to switch from its present MME pool to another MME pool. In the following, only steps that have not previously been described will be discussed.

Step 210-214 See description above.

Step 220 There is established an S1 interface between the eNB (or the first network node), undergoing TA configuration, and the new MME pool.

Steps 217, 230, 240 and 250 For simplicity, reference is made to the above descriptions of these steps.

Steps 250 and 251 The first network node receives and forwards the messages of the TAU procedure from the user equipment to the MME and vice versa for active and idle UEs, respectively. In the message used for forwarding the TAU request (i.e. the message in which the TAU request message from the UE is included when forwarded to the MME) the first network node may, if needed, include the second area identifier.

Steps 260 and 262 See above.

Step 270 The S1 interface is removed, i.e. the interface between the eNB and the new MME pool is cancelled.

Step 280 See description above.

Now referring to FIG. 13, in which there is shown an embodiment of the method for replacement of area identifiers, wherein the eNB undergoing an update of area identifiers needs to switch to another MME pool. In the following, only differences between the embodiments in FIGS. 11 and 13 are discussed. For steps that remain the same (or similar), reference is made to the descriptions above.

Step 265 When the transient switch period (or the area identifier replacement period), which started when the eNB in step 235 began to broadcast the new TAC in the system information, has elapsed, all UEs (affected by the area information update) must have performed TAU. Nota bene, all other steps have been described above.

Figure 14:
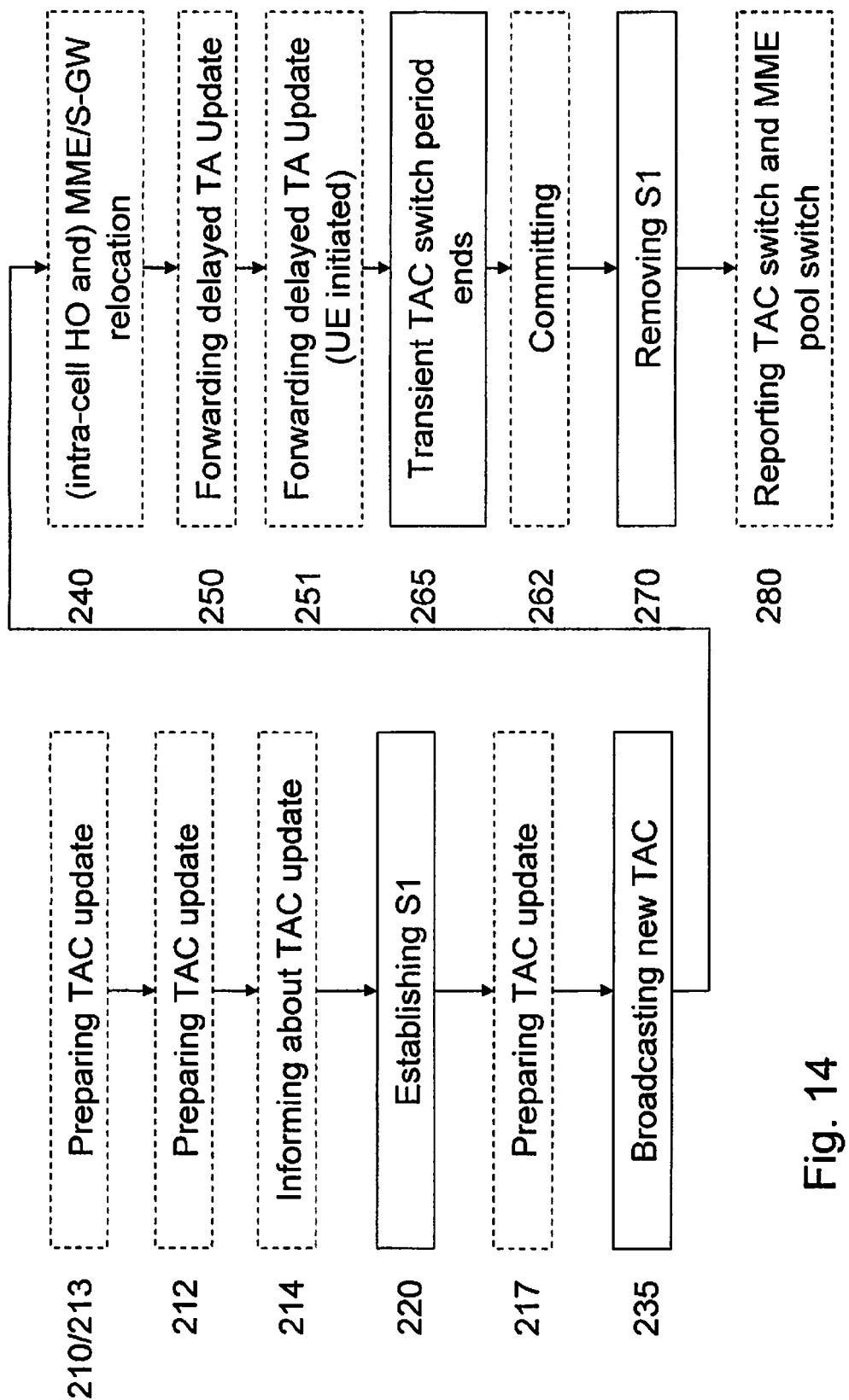
FIG. 14 shows a flow chart according to a method in the first network node for updating area information according to FIG. 13.

In FIG. 14, there is shown a flow chart of a method in the first network node, employing eNB behavior variant 2, for updating of area information (i.e. replacement of area identifier(s)), wherein the update of area information requires the first network node to switch from its present MME pool to another MME pool. In the following, only steps that have not previously been described will be discussed.

Step 265 When the transient update period (or the area identifier replacement period), which started when the eNB in step 235 began to broadcast the new TAC in the system information, has elapsed, all UEs (affected by the area information update) must have performed TAU. The eNB does actually not perform any step (except that it may disconnect any active UE which is remaining in a cell for which the new TAC is forbidden), it merely keeps track of the time since beginning of broadcasting of the new area identifier.

Above, two examples of area configuration update involving a MME pool switch have been described. Below, it is discussed, in general terms, what issues needs to be handled during an area configuration update involving a MME pool switch.

The OSS prepares both the old and the new MME pool (possibly via the eNB) for the TAC update (or switch) and for the MME pool switch.

When the OSS prepares the eNB (possibly via the MME) for a TAC update, requiring the eNB to switch to another MME pool, it provides instructions and information, which are required for the UE to establish the S1 interface towards the new MME pool.

The eNB establishes the S1 interface towards the new MME pool, using the same procedure as during initial deployment, before the TAC update (with or without parallel TAC broadcast as described above) begins.

During the transient TAC update period, i.e. the area identifier replacement period (with or without parallel TAC broadcast), the eNB keeps the S1 interface towards both the old and the new MME pool. When the transient TAC update period ends (e.g. the old TAC expires), the eNB tears down the S1 interface towards the old MME pool.

When idle UEs perform TAU in a cell, undergoing an area configuration update, the eNB directs the TAU to the new MME pool. To enable this, the eNB must snoop the NAS (Network Access Stratum) messages received from the idle UEs. Thereby, the eNB is able to identify TAU requests. (Note that in principle a UE is not idle when it sends a TAU request, since it has to switch to RRC_CONNECTED state in order to be able to send the message. Hence, "a NAS message from an idle UE" strictly refers to the first NAS message received from the UE after switching to RRC_CONNECTED state, i.e. after the Random Access procedure.) It would not work to direct all NAS messages to the new MME pool, since other NAS messages may be dependent on the presence of a UE context in the MME. However, a potential alternative that avoids snooping of NAS messages is that the eNB buffers the NAS message, irrespective of its type, establishes an S1 connection to the serving MME and then performs an MME relocation to the new MME before forwarding the buffered NAS message to the new MME. This procedure probably requires some new or modified mechanisms.

MMEs in the new MME pool do not have to use the modified paging strategy (described above) for their new cells, since the UEs they serve in the new cells have already performed TAU.

Active UEs must be relocated to the new MME pool and the new S-GW pool, involving path switching. The eNB therefore performs an S1 HO (handover) procedure towards the MME pool for each active UE in the cell. In this situation the MME must be able to accept that the source and target eNBs are the same (indicated to the MME in the HANDOVER REQUIRED message from the source eNB in which the Source ID and Target ID information elements (in terms of eNB identities) will be identical in this case). The MMEs may be designed to always accept that the source and target eNBs have the same identities. Otherwise the OSS should ensure in its preparations of the affected MME pools that all affected MMEs are aware of the eNB(s) switching MME pool so that the MMEs are prepared for this transient situation. In principle, the UE does not have to be involved in this HO procedure, but for simplicity it may be better that the eNB involves the UE too and makes it a complete "S1 intra-cell HO" procedure. In any case the new MME will allocate a new temporary identity (Globally Unique Temporary Identity, GUTI, which is transferred to the UE via NAS signaling). Assuming that reusing existing TACs in new MME pools is avoided, as is preferred according to a discussion above, all active UEs in the cell need to perform a TAU during the TAC change. An active UE would, according to the regular procedures, normally perform a TAU immediately after completing a handover to a cell in a TA that is not included in its TA list. This principle may be utilized also in TAC update situations.

Below follows two examples (denoted 1 and 2) for handling active UEs:

1. The eNB initiates an intra-cell HO for each affected UE. As all active UEs are affected in the MME pool switch case (provided that the ban on TAC moves between MME pools is honored), the previously described ways to pinpoint affected UEs are not needed in MME pool switch cases. After the intra-cell HO the UE should only consider the new TAC and thus perform a TAU. With this way to handle active UEs, the active UEs should preferably not perform TAU (neither instantaneous nor delayed) until they are triggered by the intra-cell HO. Note that this requires that intra-cell HO is used as the trigger for TAU for active UEs also for TAC updates without MME pool switch, because the UE cannot distinguish between TAC updates with and without MME pool switch. Alternatively, every active UE still schedules a delayed TAU, as previously described. If the active UE does schedule a delayed TAU and this scheduled TAU occurs before the UE has been relocated to the new AGW, there are three alternatives for how to deal with the situation:

The TAU request is directed to the serving (old) MME, in accordance with the established S1 connection. When the intra-cell HO subsequently occurs, this should not have to trigger the UE to perform a second TAU, since from the UE's perspective the TA has not changed during the handover (since the UE is already using the new TAC) and the new MME has already received the UE context from the old MME. Should the UE anyway perform a TAU after the intra-cell handover, then this would be directed to the new serving MME.

The eNB does not forward the TAU request to the MME until the UE has been relocated to the new MME (and S-GW). That is, when the eNB receives a TAU request from an active UE that has not been relocated yet, it buffers the TAU request and immediately initiates the relocation by triggering an intra-cell HO. When the relocation is finalized the eNB forwards the TAU request to the new MME. Since the new MME will provide the UE with a new list of TAs, which includes the new TAC, there will be no second TAU after the intra-cell HO. Unless the eNB is allowed to snoop NAS messages in order to recognize TAU requests, the eNB must use this behavior (i.e. buffering until concluded relocation) for all NAS messages arriving from the UE before relocation (because normally the eNB does not know the difference between different NAS messages). This is more complex than the alternative above.

The eNB establishes an S1 connection to an MME in the new MME pool and directs the TAU request to that MME. This means that the eNB maintains parallel S1 connections (for the concerned UE), one to the serving MME in the old MME pool and one to the selected MME in the new MME pool. When the UE is relocated to the new MME (and S-GW), the new MME has to be able to match the handed over UE context with the already existing one. This seams like an undesirable complication to be introduced only for the purpose of facilitating TA configuration updates.

2. The eNB does not trigger intra-cell HOs in active UEs, but still performs (the network part of) the MME and S-GW relocation procedure for all active UEs one by one. For the TAU, it is relied upon the previously described mechanism where every affected UE schedules and performs a TAU after a random delay. It should be no problem if the TAU occurs before the UE has been relocated to the new MME (and S-GW). When the MME (and S-GW) relocation subsequently occurs, the new MME receives the UE context from the old MME and can inform the home subscriber server (HSS) that it is the new serving MME for the concerned UE. Should the new MME still (for some reason) expect a TAU from the UE, then the two latter of the above described three alternative ways to handle the situation could be used (except that the MME and S-GW relocation does not involve triggering an intra-cell HO in the UE).

In the following, a description of what considerations need to be taken into account for an update procedure in case of overlapping MME pools. When an eNode B belongs to more than one MME pool, the MME pools have overlapping service areas and are called overlapping MME pools. The above described case, when the eNB does not switch MME pool, is henceforth referred to as the non-MME pool switch case. Also described above, the case, when the eNB switches from a single MME pool to another single MME pool, is henceforth referred to as the basic MME pool switch case.

A case, when the eNB switches from being single-pooled to being multi-pooled, while keeping its original MME pool, is henceforth referred to as a first multi pool switch case.

Apart from the differences discussed below, the first multi-pool switch case is similar to the non-MME pool switch case. An S1 interface to each new MME pool has to be established, but since all overlapping MME pools support all TAs in the overlap zone, no relocation of active UEs is needed. The eNB may still choose to relocate some UEs e.g. due to load balancing reasons or some MME pool selection principle. TAUs from idle UEs are directed to any of the overlapping MME pools, based on the regular MME pool selection principles.

A further case, when the eNB switches from being single-pooled to being multi-pooled, while not keeping its original MME pool, is henceforth referred to as a second multi pool switch case.

This case is similar to the basic MME pool switch case. However, a first difference is that new S1 interfaces have to be established to multiple MME pools (and temporarily maintained in parallel with the old S1 interface) and a second difference is that the eNB may select different MME pools and S-GW pools for different UEs when relocating them or forwarding TAU requests.

A still other case, when the eNB switches from being multi-pooled to being single-pooled, while keeping one of its original MME pools, is henceforth referred to as a first single pool switch case.

This case may be described as a case being in some sense midways between the non-MME pool switch case and the basic MME pool switch case. Nevertheless, it may be noted that no new S1 interface has to be established, but the S1 interface to each of the MME pools that are no longer associated with the eNB shall be removed. Not all UEs (idle as well as active) have to perform TAU, since in this case a UE's TA list may well include both the old and the new TAC (even when the ban on TAC moves between MME pools is honored). Moreover, the eNB does not have to relocate all active UEs. Instead, only those UEs that are served by other MME pools than the MME pool that still serves the eNB need to be relocated.

A yet other case, when the eNB switches from being multi-pooled to being single-pooled, while not keeping one of the overlapping pools, is henceforth referred to as a second single pool switch case.

This case is similar to the basic MME pool switch case. However, a difference is that there are multiple (old) S1 interfaces that need to be removed when the parallel TAC operation is finished.

A still other case, when the eNB switches from being multi-pooled to being multi-pooled, while keeping at least one of its original MME pools, is henceforth referred to as a first multi-multi pool switch case.

The first multi-multi pool switch case is also somewhere in between the non-MME pool switch case and the basic MME pool switch case. In the present case, the eNB establishes S1 interfaces to any new MME pools and removes S1 interfaces from any MME pools that are not kept. TAU requests from idle UEs are directed to new or kept MME pools. Active UEs that are served by MME pools that are not to be kept are relocated to new or kept MME pools.

As a last case of overlapping MME pool, a case, when the eNB switches from being multi-pooled to being multi-pooled, while not keeping any of its original MME pools, is henceforth referred to as a second multi-multi pool switch case.

This case is also similar to the basic MME pool switch case. However, a first difference is that the S1 interfaces are both established to and removed from multiple MME pools and a second difference is that the eNB has multiple MME pools to choose from when directing TAU requests and relocating UEs.

With reference to the cases of overlapping MME pools above, when an eNB switches from one set Set1 of overlapping MME pools (consisting of 1-N MME pools) to another set Set2 of overlapping MME pools (consisting of 1-M MME pools), the following general conditions apply (symbols within group theory: ∈ means "belonging to", ∉ means "not belonging to", and \ may be explained by the following example: A\B refers to all elements in group A which do not belong to group B):

The eNB should establish an S1 interface to (each MME in) every MME pool ∈ Set2 AND ∉ Set1, i.e. every MME pool in the set Set3=Set2\Set1.

The eNB should remove the S1 interface to (each MME in) every MME pool ∈ Set1 AND ∉ Set2, i.e. every MME pool in the set Set4=Set1\Set2.

The eNB should direct all TAU requests from idle UEs to an MME selected from an MME pool selected from Set2 (i.e. irrespectively of whether the UE's old serving MME pool belongs to Set2, Set1 or none of them).

The eNB should relocate every active UE, whose serving MME does not belong to an MME pool in Set2. The target MME should be selected from an MME pool selected from Set2.

With reference to the above, advantages of synchronized and unsynchronized TA configuration updates will be discussed.

During synchronized TA configuration updates the TAC updates in different cells are mutually synchronized (controlled by the OSS), whereas during unsynchronized TA configuration updates each cell's TAC update is time-wise independent of other cells' updates.

An advantage of the synchronized strategy is that the MME's behavior and paging strategy during the transient TAC update period is simpler than with the unsynchronized strategy. On the other hand, the synchronized strategy implies that more UEs are affected, which means that the load on hierarchically higher nodes, e.g. MMEs, S-GWs and home subscriber servers (HSS) will be higher. This implies that the transient TAC update period should be longer than for unsynchronized configuration, in order to smoothen out the load peak. As a result, the MME will have to maintain its modified behavior and paging strategy for a longer period of time.

Based on the assumption that TA configuration optimization will be performed by regularly recalculating an optimized TA configuration encompassing the entire network, it may seem natural to use the synchronized strategy. When a new optimized TA configuration has been calculated, it might as well be introduced simultaneously in the entire network, by letting the OSS schedule the same time for the TAC update in all affected cells.

Other types of TA configuration changes, e.g. changes of more local nature due to additions of new eNBs and MMEs and/or S-GWs, may be performed in between the overall synchronized optimizations. Hence, such TA configuration changes are restricted to be performed separated in time from the overall TA configurations.

If synchronized TA configuration updates are used, the OSS ensures that only one TA configuration update at a time may be ongoing in the network. Such supervision also ensures that conflicting TAC update instructions to the same node are avoided.

In view of the discussion above, synchronized TA configuration updates may be preferred, despite its longer transient TAC update period.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method in a first network node for replacing a first area identifier of a cell served by the first network node with a second area identifier for the cell, the first network node being part of a wireless communication network, the method comprising:
   sending the first area identifier to a user equipment in the cell;
   receiving the second area identifier from a second network node that is another part in the wireless communication network;
   sending the first and second area identifiers to the user equipment repeatedly during an area identifier replacement period indicative of an expiration period associated with the first area identifier, wherein an indication of the area identifier replacement period is received from the second network node before sending the first and second area identifiers; and
   when the area identifier replacement period has lapsed, sending the second area identifier to the user equipment and not sending the first area identifier, thereby replacing the first area identifier with the second area identifier,
   wherein the second area identifier indicates a location area that includes a plurality of cells served by the first network node after the lapse of the area identifier replacement period and after replacing the first area identifier with the second area identifier,
   wherein the cell comprises a first cell for which the second area identifier replaces the first area identifier after the lapse of the area identifier replacement period, and
   wherein the plurality of cells served by the first network node includes a second cell that corresponds to the second area identifier before and after the area identifier replacement period.

2. The method according to claim 1, wherein sending the first and second area identifiers further comprises:
   sending an indication of the area identifier replacement period indicative of the expiration period associated with the first area identifier to the user equipment.

3. The method according to claim 1, further comprising:
   sending a message to the second network node, the message being that a single area identifier is sent to the user equipment, the single area identifier being the second area identifier.

4. The method according to claim 1, wherein the second network node is a Mobility Management Entity or an Operation Support System.

5. The method of claim 1, wherein the indication of the area identifier replacement period comprises an indication of a start time of the area identifier replacement period.

6. The method of claim 1, wherein sending the first and second area identifiers comprises:
   repeatedly sending both of the first and second area identifiers from the first network node to the user equipment during the area identifier replacement period.

7. An arrangement in a first network node for replacing a first area identifier of a cell served by the first network node with a second area identifier for the cell, the first network node being part of a wireless communication network, the arrangement comprising:
- a transmitter configured to send the first area identifier to a user equipment in the cell; and
- a receiver configured to receive the second area identifier from a second network node that is another part of the wireless communication network; wherein
- the transmitter further is configured to repeatedly send the first and second area identifiers to the user equipment during an area identifier replacement period indicative of an expiration period associated with the first area identifier, wherein an indication of the area identifier replacement period is received from the second network node before sending the first and second area identifiers, and, in response to lapse of the area identifier replacement period, configured to send the second area identifier to the user equipment and not send the first area identifier, thereby being configured to replace the first area identifier with the second area identifier,
- wherein the second area identifier indicates a location area that includes a plurality of cells served by the first network node after the lapse of the area identifier replacement period and after replacing the first area identifier with the second area identifier,
- wherein the cell comprises a first cell for which the second area identifier replaces the first area identifier after the lapse of the area identifier replacement period, and
- wherein the plurality of cells served by the first network node includes a second cell that corresponds to the second area identifier before and after the area identifier replacement period.

8. The arrangement according to claim 7, wherein the transmitter further is configured to send an indication of the area identifier replacement period indicative of the expiration period associated with the first area identifier to the user equipment.

9. The arrangement according to claim 7, wherein the transmitter further is configured to send a message to the second network node, the message being that a single area identifier is sent to the user equipment, the single area identifier being the second area identifier.

10. The arrangement of claim 7, wherein the indication of the area identifier replacement period comprises an indication of a start time of the area identifier replacement period.

11. The arrangement of claim 7, wherein the transmitter is further configured to repeatedly send both of the first and second area identifiers from the first network node to the user equipment during the area identifier replacement period.

12. The arrangement of claim 7, wherein the first network node serves a third cell that corresponds to the first area identifier before and after the area identifier replacement period.

13. A radio base station configured to replace a first area identifier of a cell served by the radio base station with a second area identifier for the cell, the radio base station comprising:
- a transmitter configured to send the first area identifier to a user equipment in the cell; and
- a receiver configured to receive the second area identifier from a core network node; wherein
- the transmitter further is configured to repeatedly send the first and second area identifiers to the user equipment during an area identifier replacement period indicative of an expiration period associated with the first area identifier, wherein an indication of the area identifier replacement period is received from the second network node before sending the first and second area identifiers, and, in response to lapse of the area identifier replacement period, the transmitter is configured to send the second area identifier to the user equipment and to discontinue sending the first area identifier,
- wherein the second area identifier indicates a location area that includes a plurality of cells served by the radio base station after the lapse of the area identifier replacement period and after replacing the first area identifier with the second area identifier,
- wherein the cell comprises a first cell for which the second area identifier replaces the first area identifier after the lapse of the area identifier replacement period, and
- wherein the plurality of cells served by the radio base station includes a second cell that corresponds to the second area identifier before and after the area identifier replacement period.

14. The radio base station according to claim 13, wherein the transmitter further is configured to send an indication of the area identifier replacement period indicative of the expiration period associated with the first area identifier to the user equipment.

15. The radio base station according to claim 13, wherein the transmitter further is configured to send a message to the core network node, the message being that a single area identifier is sent to the user equipment, the single area identifier being the second area identifier.

16. The radio base station of claim 13, wherein the indication of the area identifier replacement period comprises an indication of a start time of the area identifier replacement period.

17. The radio base station of claim 13, wherein the transmitter is further configured to repeatedly send both of the first and second area identifiers from the radio base station to the user equipment during the area identifier replacement period.

* * * * *